US012671870B2

(12) United States Patent
Li et al.

(10) Patent No.: US 12,671,870 B2
(45) Date of Patent: Jun. 30, 2026

(54) METHOD, ELECTRONIC DEVICE, AND SYSTEM FOR DATA INTERACTION DURING LIVE STREAMING

(71) Applicant: Petal Cloud Technology Co., Ltd., Dongguan (CN)

(72) Inventors: Chenlong Li, Xi'an (CN); Jianan Liu, Xi'an (CN); Can Yi, Shenzhen (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 54 days.

(21) Appl. No.: 18/606,595

(22) Filed: Mar. 15, 2024

(65) Prior Publication Data

US 2024/0267593 A1 Aug. 8, 2024

Related U.S. Application Data

(63) Continuation of application No. PCT/CN2022/117304, filed on Sep. 6, 2022.

(30) Foreign Application Priority Data

Sep. 15, 2021 (CN) .......................... 202111082703.X

(51) Int. Cl.
*H04N 21/472* (2011.01)
*G09B 7/02* (2006.01)
*G09B 7/06* (2006.01)
*H04N 21/2187* (2011.01)
(52) U.S. Cl.
CPC ....... *H04N 21/472* (2013.01); *H04N 21/2187* (2013.01); *G09B 7/02* (2013.01); *G09B 7/06* (2013.01)

(58) Field of Classification Search
CPC ............. H04N 21/472; H04N 21/2187; H04N 21/4312; H04N 21/2343; H04N 21/2387; H04N 21/278; H04N 21/4788; H04N 21/2393; H04N 21/47205; H04N 21/485; H04L 65/401; H04L 65/403; H04L 65/611; H04L 67/53; G06F 9/451
See application file for complete search history.

(56) References Cited

U.S. PATENT DOCUMENTS

| | | | | |
|---|---|---|---|---|
| 2003/0152904 | A1* | 8/2003 | Doty, Jr. .................. | G09B 7/00 434/350 |
| 2018/0152764 | A1* | 5/2018 | Taylor ................ | G06Q 30/0623 |
| 2022/0179665 | A1* | 6/2022 | Rathod ................... | G06F 9/451 |
| 2022/0232287 | A1* | 7/2022 | Ren .................... | G06Q 30/0207 |

FOREIGN PATENT DOCUMENTS

| | | | | |
|---|---|---|---|---|
| CN | 109698807 A | * | 4/2019 | ............. H04L 65/61 |
| CN | 111818164 A | | 10/2020 | |
| CN | 113115062 A | | 7/2021 | |
| EP | 4120660 A1 | | 1/2023 | |

OTHER PUBLICATIONS

An English translation version of CN 109698807 A (Year: 2019).*

* cited by examiner

*Primary Examiner* — Gigi L Dubasky
(74) *Attorney, Agent, or Firm* — Conley Rose, P.C.

(57) ABSTRACT

A live streaming interaction method comprises obtaining, by an initiator end from a platform, a static resource corresponding to an interaction tool; loading a corresponding interface by the initiator end; and sending, by the initiator end, an interaction message to a receiver end based on an interaction parameter set by an initiator-end user.

20 Claims, 15 Drawing Sheets

Electronic device

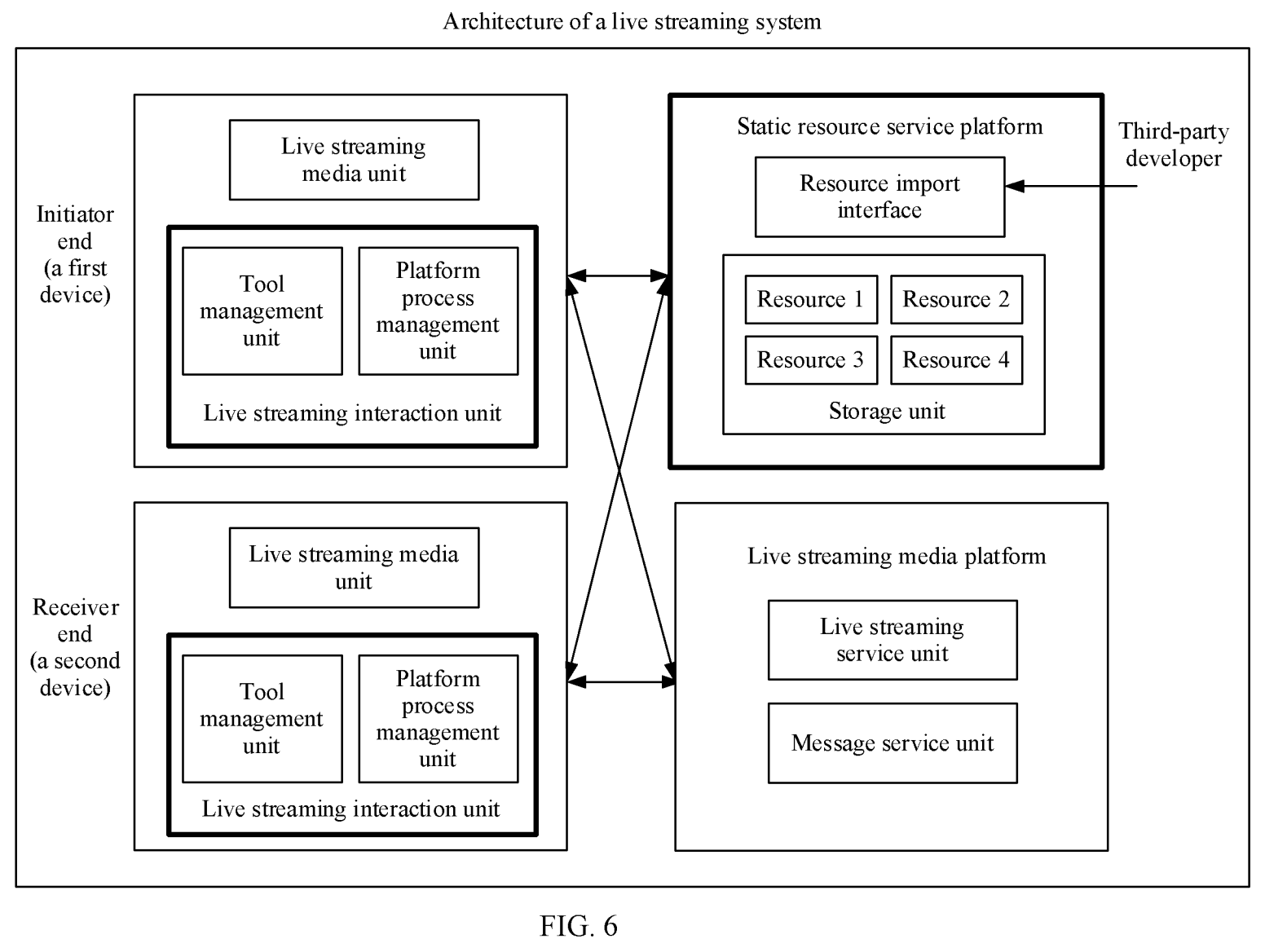

Architecture of a live streaming system

Third-party developer

Static resource service platform

Resource import interface

Resource 1 | Resource 2
Resource 3 | Resource 4

Storage unit

Live streaming media platform

Live streaming service unit

Message service unit

Initiator end (a first device)

Live streaming media unit

Tool management unit

Platform process management unit

Live streaming interaction unit

Receiver end (a second device)

Live streaming media unit

Tool management unit

Platform process management unit

Live streaming interaction unit

FIG. 6

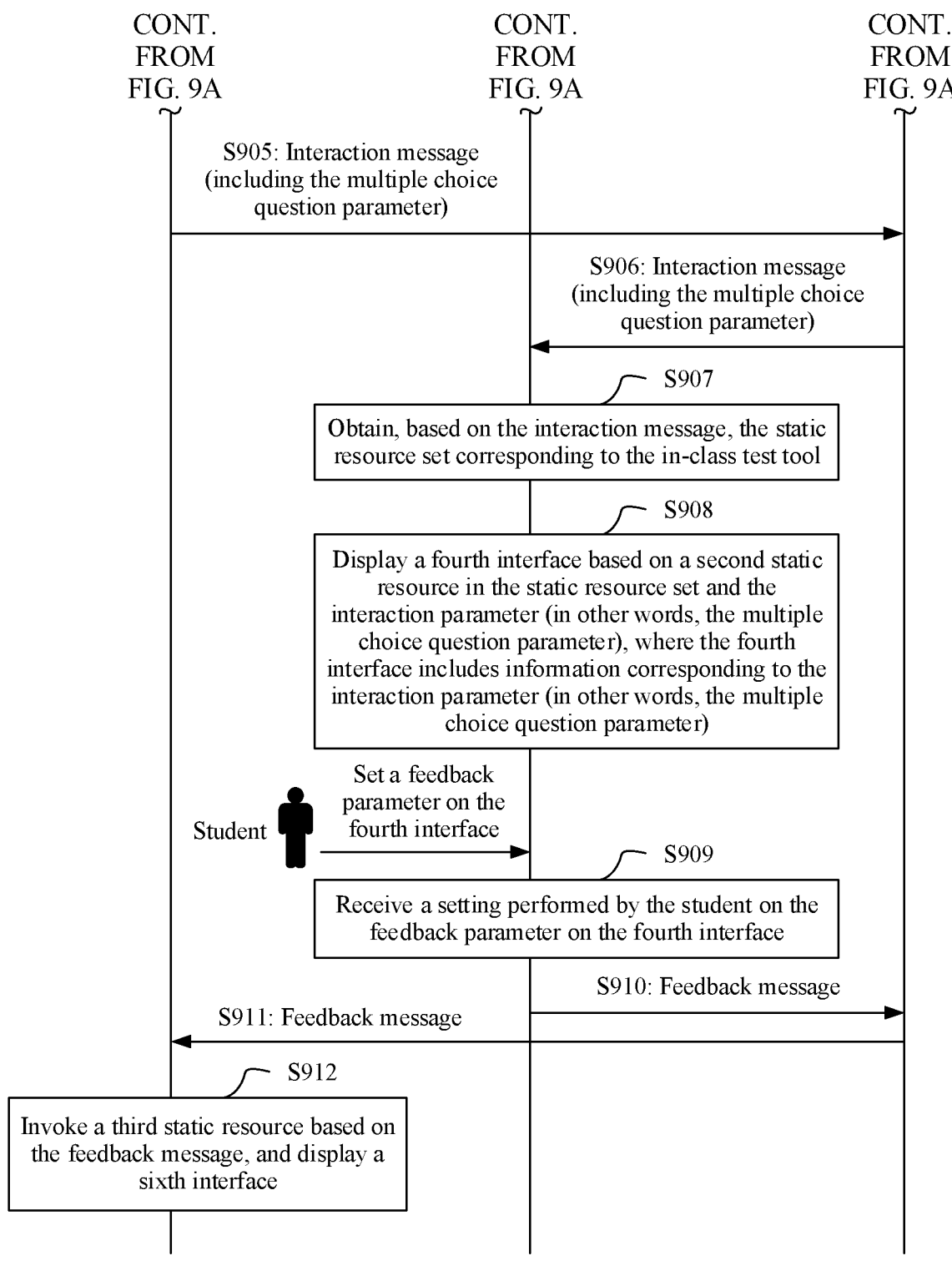

CONT.
FROM
FIG. 9A

CONT.
FROM
FIG. 9A

CONT.
FROM
FIG. 9A

S905: Interaction message
(including the multiple choice
question parameter)

S906: Interaction message
(including the multiple choice
question parameter)

S907

Obtain, based on the interaction message, the static
resource set corresponding to the in-class test tool

S908

Display a fourth interface based on a second static
resource in the static resource set and the
interaction parameter (in other words, the multiple
choice question parameter), where the fourth
interface includes information corresponding to the
interaction parameter (in other words, the multiple
choice question parameter)

Student

Set a feedback
parameter on the
fourth interface

S909

Receive a setting performed by the student on the
feedback parameter on the fourth interface S910: Feedback message S911: Feedback message

S912

Invoke a third static resource based on
the feedback message, and display a
sixth interface

FIG. 9B

Teacher-end device

Teacher-end device

Teacher-end device

Student-end device

Student-end device

Teacher-end device

METHOD, ELECTRONIC DEVICE, AND SYSTEM FOR DATA INTERACTION DURING LIVE STREAMING

CROSS-REFERENCE TO RELATED APPLICATIONS

This is a continuation application of International Patent Application No. PCT/CN2022/117304, filed on Sep. 6, 2022, which claims priority to Chinese Patent Application No. 202111082703.X, filed on Sep. 15, 2021. The disclosures of the aforementioned applications are hereby incorporated by reference in their entireties.

TECHNICAL FIELD

Embodiments of this application relate to the field of communication technologies, and in particular, to a live streaming interaction method, an electronic device, and a system.

BACKGROUND

With the development of network communication technologies, network live streaming is increasingly applied to fields such as life, social networking, entertainment, and education due to its features such as real-time performance and interactivity. To enrich user experience and communication of network live streaming, live streaming interaction is increasingly applied to network live streaming.

However, during conventional live streaming interaction, an initiator end usually performs a corresponding type of interaction based on interaction messages in different formats, for example, sending a gift, a card, an emoji, a shopping link, or a bullet comment. However, the foregoing conventional technology cannot support access and customization of a third-party developer, and therefore has poor openness and scalability.

SUMMARY

This application provides a live streaming interaction method, an electronic device, and a system, to improve compatibility, scalability, and openness of live streaming interaction.

To achieve the foregoing objectives, the following technical solutions are used in embodiments of this application.

According to a first aspect, a live streaming interaction method is provided, where the method is applied to a process of live streaming interaction between a first device and a second device. The method includes, in response to receiving a selection operation performed by a first user on a first tool on a first interface, the first device displays a second interface based on a first static resource that is in a static resource set and that corresponds to the first tool, where the second interface is used by the first user to set an interaction parameter, the static resource set is customized by a third-party developer according to an interaction requirement, and the first static resource indicates a first interaction service process. The first device receives a setting performed by the first user on the interaction parameter on the second interface. The first device sends an interaction message to the second device based on the setting performed by the first user on the interaction parameter on the second interface, where the interaction message includes the parameter.

According to the solution provided in the first aspect, a function of customizing an interaction process of an interaction tool is provided for the third-party developer, so that the interaction process can be adaptively adjusted according to the actual interaction requirement. On this basis, during live streaming interaction, an initiator end only needs to obtain a static resource corresponding to the interaction tool from a platform, load a corresponding interface, and send an interaction message to a receiver end based on an interaction parameter set by an initiator-end user. Based on a unified platform framework and an interface provided in this application, live streaming interaction is not limited to single interaction content, but may also adaptively enrich live streaming interaction content, thereby improving compatibility, scalability, and openness of live streaming interaction.

In a possible implementation, the first device sends an interaction message to the second device based on the setting performed by the first user on the interaction parameter on the second interface that includes the first device displays a third interface based on the setting performed by the first user on the interaction parameter on the second interface, where the third interface includes a first button, and the first button is used to confirm the setting of the interaction parameter. In response to receiving an operation performed on the first button, the first device sends the interaction message to the second device. In a case, the interaction message may be sent by the first device to the second device when the first device receives the operation performed on the first button. A sending occasion of the interaction message is not limited in this application, and is determined based on customization of the third-party developer. Therefore, this application has high flexibility, compatibility, and scalability.

In a possible implementation, the static resource set is obtained by the first device from a third device. The third device is configured to manage an interaction service. The static resource set is customized in the third device by the third-party developer according to the interaction requirement. A manner of obtaining the static resource set by the first device when the first device receives the selection operation performed by the first user on the first tool on the first interface is not limited in this application. For example, the first device may obtain, from the third device, the static resource set customized by the third-party developer according to the interaction requirement.

In a possible implementation, the first device stores the static resource set. A manner of obtaining the static resource set by the first device when the first device receives the selection operation performed by the first user on the first tool on the first interface is not limited in this application. For example, the first device may store the static resource set.

In a possible implementation, the method further includes the second device obtains the static resource set based on the interaction message. The second device displays a fourth interface based on a second static resource in the static resource set and the interaction parameter, where the fourth interface includes information corresponding to the interaction parameter. In this application, during live streaming interaction, the receiver end only needs to obtain, based on the interaction message, the static resource corresponding to the interaction tool, and load a corresponding interface. This solution allows the third-party developer to customize the static resource corresponding to the interaction tool according to the actual interaction requirement and therefore has high flexibility, compatibility, scalability, and openness.

In a possible implementation, the interaction message further includes an identifier of the static resource set. The second device obtains the static resource set based on the interaction message that includes the second device obtains the static resource set from the third device based on the identifier that is of the static resource set and that is in the interaction message, where the third device is configured to manage an interaction service, and the static resource set is customized in the third device by the third-party developer according to the interaction requirement. A manner of obtaining the static resource set by the second device after the second device receives the interaction message is not limited in this application. For example, the second device may obtain, from the third device, the static resource set customized by the third-party developer according to the interaction requirement.

In a possible implementation, the method further includes the second device receives a setting performed by a second user on a feedback parameter on the fourth interface, and displays a fifth interface, where the fifth interface includes a second button, and the second button is used to confirm the setting of the feedback parameter. In response to receiving an operation performed on the second button, the second device sends a feedback message to the first device, where the feedback message includes the feedback parameter. The first device displays a sixth interface based on the feedback message. In a case, the feedback message may be sent by the second device to the first device when the second device receives the operation performed on the second button. A sending occasion of the feedback message is not limited in this application, and may be determined based on customization of the third-party developer. Therefore, this application has high flexibility, compatibility, and scalability.

In a possible implementation, the fourth interface includes one or more edit boxes and/or one or more options. The second device receives a setting performed by a second user on a feedback parameter on the fourth interface that includes the second device receives at least one editing operation performed by the second user on the one or more edit boxes on the fourth interface, and/or at least one selection operation performed on the one or more options on the fourth interface. Specific content of an interface of the setting of the feedback parameter is not limited in this application. For example, the interface may include the one or more edit boxes and/or the one or more options and is used by the user to set the feedback parameter. This solution allows the third-party developer to customize the static resource corresponding to the interaction tool according to the actual interaction requirement and therefore has high flexibility, compatibility, scalability, and openness.

In a possible implementation, the first device displays a second interface based on a first static resource that is in a static resource set and that corresponds to the first tool that includes the first device parses the first static resource corresponding to the first tool, to obtain the interaction service process indicated by the first static resource. The first device runs the first tool based on the interaction service process indicated by the first static resource, to display the second interface. In this application, the interaction initiator end may present an interaction parameter interface based on the static resource customized by the third party. This solution allows the third-party developer to customize the static resource corresponding to the interaction tool according to the actual interaction requirement and therefore has high flexibility, compatibility, scalability, and openness.

In a possible implementation, the second interface includes one or more edit boxes and/or one or more options. The first device receives a setting performed by the first user on the interaction parameter on the second interface that includes the first device receives at least one editing operation performed by the first user on the one or more edit boxes on the second interface, and/or at least one selection operation performed on the one or more options on the second interface. Specific content of an interface of the setting of the interaction parameter is not limited in this application. For example, the interface may include the one or more edit boxes and/or the one or more options and is used by the user to set the interaction parameter. This solution allows the third-party developer to customize the static resource corresponding to the interaction tool according to the actual interaction requirement and therefore has high flexibility, compatibility, scalability, and openness.

In a possible implementation, the first static resource is a predefined first invoked static resource in the static resource set. In this application, the device may invoke the static resource one by one based on a static resource invoking sequence predefined by the third-party developer.

In a possible implementation, the first device sends an interaction message to the second device based on the setting performed by the first user on the interaction parameter on the second interface that includes the first device sends by using a fourth device, the interaction message to the second device, based on the setting performed by the first user on the interaction parameter on the second interface, where the fourth device is configured to manage a live streaming service. In some cases, the interaction initiator end may forward the interaction message to the receiver end by using a device for managing the live streaming service. This solution can be implemented based on a conventional live streaming architecture and therefore has high compatibility.

According to a second aspect, a live streaming interaction method is provided. The method includes, in response to receiving a selection operation performed by a first user on a first tool on a first interface, a first device displays a second interface based on a first static resource that is in a static resource set and that corresponds to the first tool, where the second interface is used by the first user to set an interaction parameter, the static resource set is customized by a third-party developer according to an interaction requirement, and the first static resource indicates a first interaction service process. The first device receives a setting performed by the first user on the interaction parameter on the second interface. The first device sends an interaction message to a second device based on the setting performed by the first user on the interaction parameter on the second interface, where the interaction message includes the parameter. The first device receives a feedback message from the second device. The first device displays a sixth interface based on the feedback message.

According to the solution provided in the second aspect, a function of customizing an interaction process of an interaction tool is provided for the third-party developer, so that the interaction process can be adaptively adjusted according to the actual interaction requirement. On this basis, during live streaming interaction, an initiator end only needs to obtain a static resource corresponding to the interaction tool from a platform, load a corresponding interface, and send an interaction message to a receiver end based on an interaction parameter set by an initiator-end user. Based on a unified platform framework and an interface provided in this application, live streaming interaction may not limited to single interaction content, but may also adaptively enrich live streaming interaction content, thereby improving compatibility, scalability, and openness of live streaming interaction.

In a possible implementation, the first device sends an interaction message to a second device based on the setting performed by the first user on the interaction parameter on the second interface that includes the first device displays a third interface based on the setting performed by the first user on the interaction parameter on the second interface, where the third interface includes a first button, and the first button is used to confirm the setting of the interaction parameter. In response to receiving an operation performed on the first button, the first device sends the interaction message to the second device. In a case, the interaction message may be sent by the first device to the second device when the first device receives the operation performed on the first button. A sending occasion of the interaction message is not limited in this application, and is determined based on customization of the third-party developer. Therefore, this application has high flexibility, compatibility, and scalability.

In a possible implementation, the static resource set is obtained by the first device from a third device. The third device is configured to manage an interaction service. The static resource set is customized in the third device by the third-party developer according to the interaction requirement. A manner of obtaining the static resource set by the first device when the first device receives the selection operation performed by the first user on the first tool on the first interface is not limited in this application. For example, the first device may obtain, from the third device, the static resource set customized by the third-party developer according to the interaction requirement.

In a possible implementation, the first device stores the static resource set. A manner of obtaining the static resource set by the first device when the first device receives the selection operation performed by the first user on the first tool on the first interface is not limited in this application. For example, the first device may store the static resource set.

In a possible implementation, the first device displays a second interface based on a first static resource that is in a static resource set and that corresponds to the first tool that includes the first device parses the first static resource corresponding to the first tool, to obtain the interaction service process indicated by the first static resource. The first device runs the first tool based on the interaction service process indicated by the first static resource, to display the second interface. In this application, the interaction initiator end may present an interaction parameter interface based on the static resource customized by the third party. This solution allows the third-party developer to customize the static resource corresponding to the interaction tool according to the actual interaction requirement and therefore has high flexibility, compatibility, scalability, and openness.

In a possible implementation, the second interface includes one or more edit boxes and/or one or more options. The first device receives a setting performed by the first user on the interaction parameter on the second interface that includes the first device receives at least one editing operation performed by the first user on the one or more edit boxes on the second interface, and/or at least one selection operation performed on the one or more options on the second interface. Specific content of an interface of the setting of the interaction parameter is not limited in this application. For example, the interface may include the one or more edit boxes and/or the one or more options and is used by the user to set the interaction parameter. This solution allows the third-party developer to customize the static resource corresponding to the interaction tool according to the actual interaction requirement and therefore has high flexibility, compatibility, scalability, and openness.

In a possible implementation, the first static resource is a predefined first invoked static resource in the static resource set. In this application, a device may invoke the static resource one by one based on a static resource invoking sequence predefined by the third-party developer.

In a possible implementation, the first device sends an interaction message to a second device based on the setting performed by the first user on the interaction parameter on the second interface that includes the first device sends by using a fourth device, the interaction message to the second device, based on the setting performed by the first user on the interaction parameter on the second interface, where the fourth device is configured to manage a live streaming service. In some cases, the interaction initiator end may forward the interaction message to the receiver end by using a device for managing the live streaming service. This solution can be implemented based on a conventional live streaming architecture and therefore has high compatibility.

According to a third aspect, a live streaming interaction method is provided. The method includes a second device receives an interaction message from a first device, where the interaction message includes an interaction parameter. The second device obtains a static resource set based on the interaction message, where the static resource set is customized by a third-party developer according to an interaction requirement, and the static resource set indicates one or more interaction service processes. The second device displays a fourth interface based on a second static resource in the static resource set and the interaction parameter, where the fourth interface includes information corresponding to the interaction parameter.

According to the solution provided in the third aspect, a function of customizing an interaction process of an interaction tool is provided for the third-party developer, so that the interaction process can be adaptively adjusted according to the actual interaction requirement. On this basis, during live streaming interaction, a receiver end only needs to obtain, based on an interaction message, a static resource corresponding to the interaction tool and load a corresponding interface. Based on a unified platform framework and an interface provided in this application, live streaming interaction can be not limited to single interaction content, but can adaptively enrich live streaming interaction content, thereby improving compatibility, scalability, and openness of live streaming interaction.

In a possible implementation, the second device stores the static resource set. A manner of obtaining the static resource set by the first device when the first device receives a selection operation performed by a first user on a first tool on a first interface is not limited in this application. For example, the first device may store the static resource set.

In a possible implementation, the interaction message further includes an identifier of the static resource set. The second device obtains a static resource set based on the interaction message that includes the second device obtains the static resource set from a third device based on the identifier that is of the static resource set and that is in the interaction message, where the third device is configured to manage an interaction service, and the static resource set is customized in the third device by the third-party developer according to the interaction requirement. A manner of obtaining the static resource set by the second device when the second device receives the interaction message is not limited in this application. For example, the second device may obtain, from the third device, the static resource set customized by the third-party developer according to the interaction requirement.

In a possible implementation, the method further includes the second device receives a setting performed by a second user on a feedback parameter on the fourth interface, and displays a fifth interface, where the fifth interface includes a second button, and the second button is used to confirm the setting of the feedback parameter. In response to receiving an operation performed on the second button, the second device sends a feedback message to the first device, where the feedback message includes the feedback parameter. In a case, the feedback message may be sent by the second device to the first device when the second device receives the operation performed on the second button. A sending occasion of the feedback message is not limited in this application, and is determined based on customization of the third-party developer. Therefore, this application has high flexibility, compatibility, and scalability.

In a possible implementation, the fourth interface includes one or more edit boxes and/or one or more options. The second device receives a setting performed by a second user on a feedback parameter on the fourth interface that includes the second device receives at least one editing operation performed by the second user on the one or more edit boxes on the fourth interface, and/or at least one selection operation performed on the one or more options on the fourth interface. Specific content of an interface of the setting of the feedback parameter is not limited in this application. For example, the interface may include the one or more edit boxes and/or the one or more options and is used by the user to set the feedback parameter. This solution allows the third-party developer to customize the static resource corresponding to the interaction tool according to the actual interaction requirement and therefore has high flexibility, compatibility, scalability, and openness.

According to a fourth aspect, a first device is provided. The first device includes a memory configured to store a computer program; a transceiver, configured to receive or send a radio signal; and a processor, configured to execute the computer program, so that in response to receiving a selection operation performed by a first user on a first tool on a first interface, the first device displays, based on a first static resource that is in a static resource set and that corresponds to the first tool, a second interface used by the first user to set an interaction parameter; receives a setting performed by the first user on the interaction parameter on the second interface; sends an interaction message to the second device based on the setting performed by the first user on the interaction parameter on the second interface, where the interaction message includes the parameter; receives a feedback message from the second device; and displays a sixth interface based on the feedback message. The static resource set is customized by the third-party developer according to an interaction requirement. The first static resource indicates a first interaction service process.

According to the solution provided in the fourth aspect, a function of customizing an interaction process of an interaction tool is provided for the third-party developer, so that the interaction process can be adaptively adjusted according to the actual interaction requirement. On this basis, during live streaming interaction, an initiator end only needs to obtain a static resource corresponding to the interaction tool from a platform, load a corresponding interface, and send an interaction message to a receiver end based on an interaction parameter set by an initiator-end user. Based on a unified platform framework and an interface provided in this application, live streaming interaction can be not limited to single interaction content, but can adaptively enrich live streaming interaction content, thereby improving compatibility, scalability, and openness of live streaming interaction.

In a possible implementation, the processor is configured to execute the computer program, so that the first device displays, based on the setting performed by the first user on the interaction parameter on the second interface, a third interface including a first button; and in response to receiving an operation performed on the first button, sends the interaction message to the second device. The first button is used to confirm the setting of the interaction parameter. In a case, the interaction message may be sent by the first device to the second device when the first device receives the operation performed on the first button. A sending occasion of the interaction message is not limited in this application, and is determined based on customization of the third-party developer. Therefore, this application has high flexibility, compatibility, and scalability.

In a possible implementation, the static resource set is obtained by the first device from a third device by using the transceiver. The third device is configured to manage an interaction service. The static resource set is customized in the third device by the third-party developer according to the interaction requirement. A manner of obtaining the static resource set by the first device when the first device receives the selection operation performed by the first user on the first tool on the first interface is not limited in this application. For example, the first device may obtain, from the third device, the static resource set customized by the third-party developer according to the interaction requirement.

In a possible implementation, the memory of the first device stores the static resource set. A manner of obtaining the static resource set by the first device when the first device receives the selection operation performed by the first user on the first tool on the first interface is not limited in this application. For example, the first device may store the static resource set.

In a possible implementation, the processor is configured to execute the computer program, so that the first device parses the first static resource that indicates the interaction service process and that corresponds to the first tool; and runs the first tool based on the interaction service process indicated by the first static resource, to display the second interface. In this application, the interaction initiator end may present an interaction parameter interface based on the static resource customized by the third party. This solution allows the third-party developer to customize the static resource corresponding to the interaction tool according to the actual interaction requirement and therefore has high flexibility, compatibility, scalability, and openness.

In a possible implementation, the second interface includes one or more edit boxes and/or one or more options. The processor is configured to execute the computer program, so that the first device receives at least one editing operation performed by the first user on the one or more edit boxes on the second interface, and/or at least one selection operation performed on the one or more options on the second interface. Specific content of an interface of the setting of the interaction parameter is not limited in this application. For example, the interface may include the one or more edit boxes and/or the one or more options and is used by the user to set the interaction parameter. This solution allows the third-party developer to customize the static resource corresponding to the interaction tool according to the actual interaction requirement and therefore has high flexibility, compatibility, scalability, and openness.

In a possible implementation, the first static resource is a predefined first invoked static resource in the static resource set. In this application, a device may invoke the static resource one by one based on a static resource invoking sequence predefined by the third-party developer.

In a possible implementation, the processor is configured to execute the computer program, so that the first device sends by using a fourth device, the interaction message to the second device, based on the setting performed by the first user on the interaction parameter on the second interface, where the fourth device is configured to manage a live streaming service. In some cases, the interaction initiator end may forward the interaction message to the receiver end by using a device for managing the live streaming service. This solution can be implemented based on a conventional live streaming architecture and therefore has high compatibility.

According to a fifth aspect, a second device is provided. The second device includes a memory configured to store a computer program; a transceiver configured to receive or send a radio signal; and a processor configured to execute the computer program, so that the second device receives an interaction message that is from a first device and that includes an interaction parameter; obtains, based on the interaction message, a static resource set customized by a third-party developer according to an interaction requirement; and displays a fourth interface based on a second static resource in the static resource set and the interaction parameter, where the fourth interface includes information corresponding to the interaction parameter. The static resource set indicates one or more interaction service processes.

According to the solution provided in the fifth aspect, a function of customizing an interaction process of an interaction tool is provided for the third-party developer, so that the interaction process can be adaptively adjusted according to the actual interaction requirement. On this basis, during live streaming interaction, a receiver end only needs to obtain, based on an interaction message, a static resource corresponding to the interaction tool, and load a corresponding interface. Based on a unified platform framework and an interface provided in this application, live streaming interaction can be not limited to single interaction content, but can adaptively enrich live streaming interaction content, thereby improving compatibility, scalability, and openness of live streaming interaction.

In a possible implementation, the memory of the second device stores the static resource set. A manner of obtaining the static resource set by the first device when the first device receives a selection operation performed by a first user on a first tool on a first interface is not limited in this application. For example, the first device may store the static resource set.

In a possible implementation, the interaction message further includes an identifier of the static resource set. The processor is configured to execute the computer program, so that the second device obtains the static resource set from a third device based on the identifier that is of the static resource set and that is in the interaction message, where the third device is configured to manage an interaction service, and the static resource set is customized in the third device by the third-party developer according to the interaction requirement. A manner of obtaining the static resource set by the second device when the second device receives the interaction message is not limited in this application. For example, the second device may obtain, from the third device, the static resource set customized by the third-party developer according to the interaction requirement.

In a possible implementation, the processor is further configured to execute the computer program, so that the second device receives a setting performed by a second user on a feedback parameter on the fourth interface; displays a fifth interface including a second button; and in response to receiving an operation performed on the second button, sends a feedback message to the first device, where the feedback message includes the feedback parameter. The second button is used to confirm the setting of the feedback parameter. In a case, the feedback message may be sent by the second device to the first device when the second device receives the operation performed on the second button. A sending occasion of the feedback message is not limited in this application, and is determined based on customization of the third-party developer. Therefore, this application has high flexibility, compatibility, and scalability.

In a possible implementation, the fourth interface includes one or more edit boxes and/or one or more options. The processor is configured to execute the computer program, so that the second device receives at least one editing operation performed by the second user on the one or more edit boxes on the fourth interface, and/or at least one selection operation performed on the one or more options on the fourth interface. Specific content of an interface of the setting of the feedback parameter is not limited in this application. For example, the interface may include the one or more edit boxes and/or the one or more options and is used by the user to set the feedback parameter. This solution allows the third-party developer to customize the static resource corresponding to the interaction tool according to the actual interaction requirement and therefore has high flexibility, compatibility, scalability, and openness.

According to a sixth aspect, a communication system is provided. The communication system includes the first device in any possible implementation of the fourth aspect and the second device in any possible implementation of the fifth aspect.

In a possible implementation, the communication system further includes a third device that is configured to manage an interaction service.

In a possible implementation, the communication system further includes a fourth device that is configured to manage a live streaming service.

According to a seventh aspect, a computer-readable storage medium is provided. The computer-readable storage medium stores computer program code. When the computer program code is executed by a processor, the process is enabled to implement the method in any possible implementation of the second aspect or the third aspect.

According to an eighth aspect, a chip system is provided. The chip system includes a processor and a memory. The memory stores computer program code. When the computer program code is executed by the processor, the process is enabled to implement the method in any possible implementation of the second aspect or the third aspect. The chip system may include a chip, or may include a chip and another discrete component.

According to a ninth aspect, a computer program product is provided. The computer program product includes computer instructions. When the computer instructions are run on a computer, the computer is enabled to implement the method in any possible implementation of the second aspect or the third aspect.

BRIEF DESCRIPTION OF DRAWINGS

FIG. 6 is a schematic diagram of an architecture of a live streaming system used for live streaming interaction according to an embodiment of this application;

FIG. 9A and FIG. 9B are interaction diagrams of a live streaming interaction method in an online class live streaming scenario according to an embodiment of this application;

DESCRIPTION OF EMBODIMENTS

The following describes the technical solutions in embodiments of this application with reference to the accompanying drawings in embodiments of this application. In the descriptions in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more such features. In the descriptions of embodiments, unless otherwise specified, "a plurality of" means two or more.

An embodiment of this application provides a live streaming interaction method. The method is applied to a process of interaction between a live streamer end and an audience end during network live streaming. A party that initiates live streaming is referred to as the live streamer end, and a party that receives live streaming content is referred to as the audience end.

The network live streaming in this embodiment of this application may include but not limited to conference live streaming, class live streaming, shopping live streaming, video live streaming, game live streaming, or the like. For example, the live streamer end may perform network live streaming by using a live streaming application installed on a device or another application that supports a live streaming function and that is installed on a device. Correspondingly, the audience end may receive live streaming content by using a live streaming application installed on a device or another application that supports a live streaming function and that is installed on a device. For example, the live streaming application may be a conference live streaming application, a teaching live streaming application, a shopping live streaming application, an entertainment live streaming application, or the like. This is not limited in embodiments of this application.

For example, for class live streaming, a live streamer end that initiates live streaming is an electronic device of a teacher, and an audience end that receives live streaming content is an electronic device of students.

Figure 1:
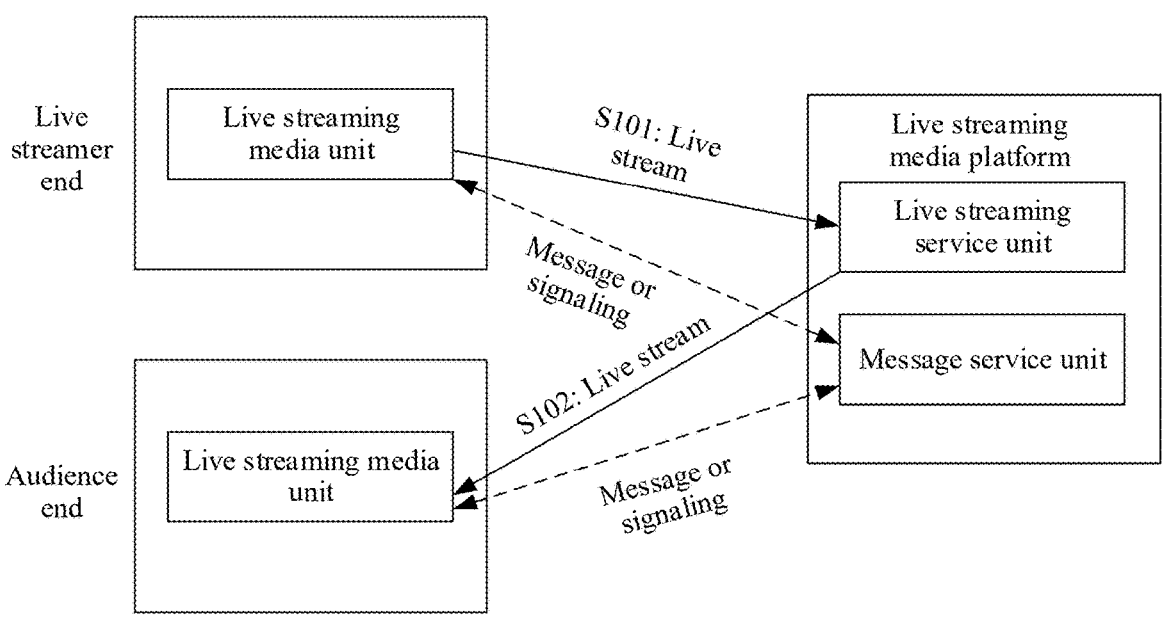
FIG. 1 is a schematic diagram of an architecture of a live streaming system according to an embodiment of this application.

FIG. 1 is a schematic diagram of a network live streaming process. In some embodiments, network live streaming may be implemented based on a live streaming system that includes a live streamer end, an audience end, and a live streaming media platform shown in FIG. 1.

As shown in FIG. 1, the live streamer end and the audience end each include a live streaming media unit. The live streaming media platform is used to manage a live streaming service. The live streaming media platform includes a live streaming service unit and a message service unit. The live streaming media unit of the live streamer end is responsible for sending, to the live streaming service unit of the live streaming media platform based on an operation of a user, a live stream (for example, a real-time audio/video stream) corresponding to a live streaming image of the live streamer end. The live streaming media unit of the audience end is responsible for obtaining the live stream of the live streamer end from the live streaming service unit of the live streaming media platform, and presenting corresponding live streaming content on the audience end. The live streaming service unit of the live streaming media platform is configured to forward the live stream of the live streamer end to the audience end. The message service unit of the live streaming media platform is responsible for message or signaling plane control in live streaming, for example, controlling muting of all attendees in a conference.

In embodiments of this application, an electronic device (for example, the live streamer end or the audience end) may include but is not limited to a smartphone, a personal computer (PC) such as, for example, a notebook computer, a desktop computer, or an ultra-mobile personal computer (UMPC)), a tablet computer, a television, an augmented reality (AR) device/a virtual reality (VR) device, a wireless terminal in industrial control, a wireless terminal in self-driving vehicle, a wireless terminal in transportation safety, a wireless terminal in a smart city, a sensor device (such as a monitoring terminal), and an Internet of things (IOT)

device, or the like. A specific function and structure of the electronic device are not limited in this application.

As shown in FIG. 1, the live streamer end provides a live streaming service for the audience end that may include the following steps S101 and S102:

S101: The live streaming media unit of the live streamer end sends a live stream to the live streaming service unit of the live streaming media platform.

S102: The live streaming service unit of the live streaming media platform sends the live stream from the live streamer end to the live streaming media unit of the audience end.

Further, the audience end displays a corresponding live streaming interface based on the live stream from the live streamer end.

In some embodiments, for a scenario in which the live streamer end interacts with the audience end during network live streaming, the message service unit of the live streaming media platform shown in FIG. 1 may be further responsible for message or signaling plane control such as forwarding a chat message or forwarding a gift during live streaming. To provide an interaction service during network live streaming, further, a server end is further disposed in the architecture of the live streaming system, and is configured to process an interaction message between ends, generate interaction content, forward interaction content, and the like.

When the live streamer end interacts with the audience end, a party that initiates interaction is referred to as an initiator end, and the other party is referred to as a receiver end.

During network live streaming interaction, the initiator end may be the live streamer end, or may be the audience end. Correspondingly, the receiver end may be the audience end, or may be the live streamer end.

For example, in a live streaming interaction scenario, the live streamer end may present a shopping link to the audience end. In this case, the live streamer end is the initiator end, and the audience end is the receiver end. For another example, in a live streaming interaction scenario, the audience end may send a gift to the live streamer end. In this case, the audience end is the initiator end, and the live streamer end is the receiver end. Specific functions of the initiator end and the receiver end and a specific interaction scenario are not limited in embodiments of this application.

Figure 2:
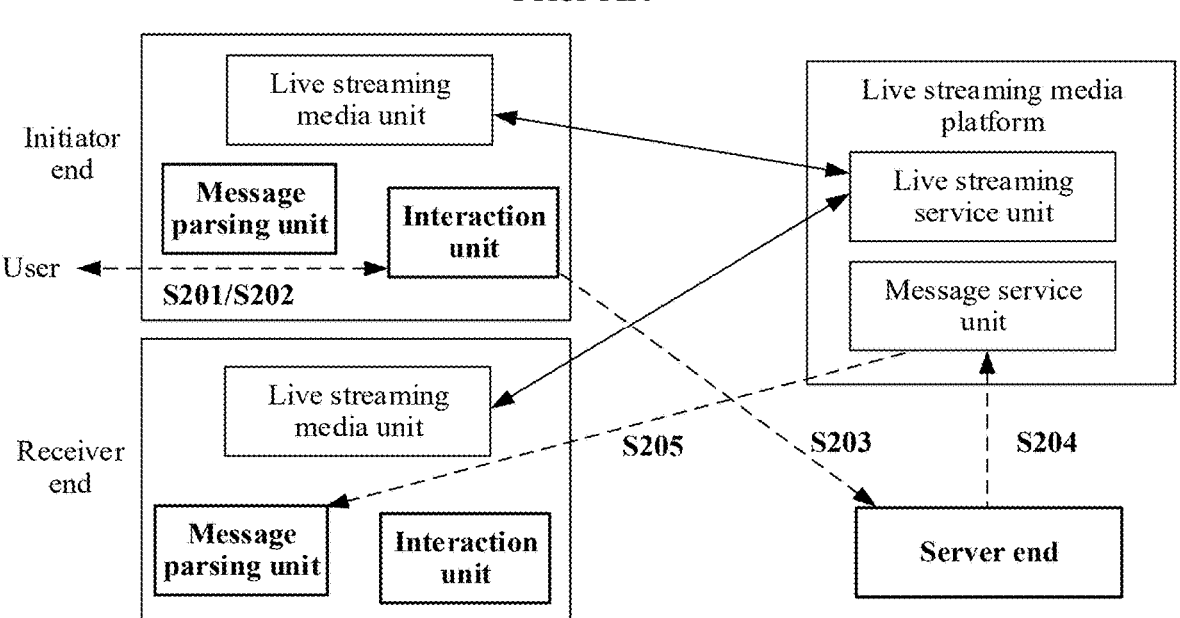
FIG. 2 is a schematic diagram of an architecture of a live streaming system according to an embodiment of this application.

As shown in FIG. 2, an initiator end and a receiver end each include an interaction unit and a message parsing unit. The interaction unit is responsible for providing an interaction window or interface, receiving an interaction operation of a user, and sending related content such as an interaction message to a server end. The message parsing unit is responsible for parsing received interaction content.

As shown in FIG. 2, the initiator end sends an interaction message to the receiver end in response to an operation performed by the user for initiating interaction that may include the following steps S201 to S205:

S201: The interaction unit of the initiator end presents an interaction window or interface.

S202: The interaction unit of the initiator end receives the interaction operation of the user on the interaction window or interface. The interaction operation is, for example, selecting a sending operation.

S203: In response to receiving the interaction operation performed by the user on the interaction window or interface, the interaction unit of the initiator end sends the interaction message such as a gift, a card, an emoji, a shopping link, a bullet comment, or hand raising to the server end.

S204: The server end generates corresponding interaction content, and sends the interaction content to a message service unit of a live streaming media platform.

S205: The message service unit of the live streaming media platform forwards the interaction content from the initiator end to the message parsing unit of the receiver end.

Further, the message parsing unit of the receiver end parses the received interaction content and presents the content accordingly, for example, displaying a gift, a card, an emoji, a shopping link, a bullet comment, or a hand raising tip.

In an example, formats of interaction messages are different for different interaction types (such as a gift, a card, an emoji, a shopping link, a bullet comment, or hand raising). The receiver end may parse the interaction content corresponding to the interaction messages in different formats and present the content accordingly.

However, in an architecture of a live streaming system shown in FIG. 2, the server end is limited to providing a service only for a specific service scenario, and cannot support access and customization of a third-party developer. Therefore, openness and scalability are poor.

Figure 3:
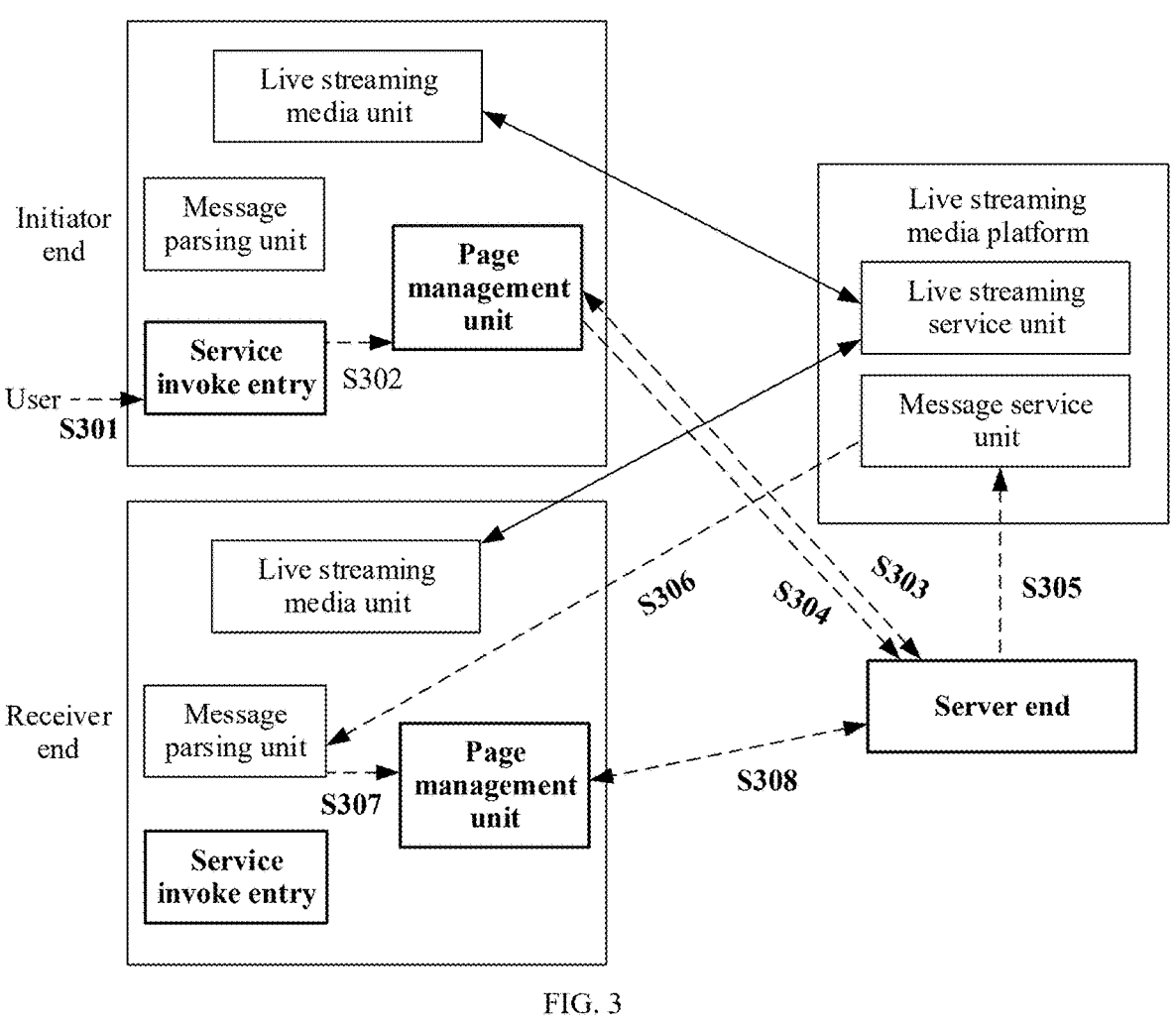
FIG. 3 is a schematic diagram of an architecture of a live streaming system according to an embodiment of this application.

In another possible structure, as shown in FIG. 3, an initiator end and a receiver end each include a service invoke entry, a message parsing unit, and a page management unit. The service invoke entry is responsible for providing an interaction tool, receiving selection performed by a user for an interaction tool, and requesting a corresponding page from the page management unit based on the selection performed by the user for the interaction tool. The message parsing unit is responsible for parsing a received interaction message. The page management unit is responsible for managing a page (for example, a hypertext markup language (HTML) 5 page), obtaining a page-related resource from a server end, presenting a page, receiving a selection operation performed by the user on a page, forwarding an interaction message, and the like.

As shown in FIG. 3, based on an architecture of a live streaming system shown in FIG. 3, the initiator end sends an interaction message to the receiver end in response to an operation performed by the user for initiating interaction that may include the following steps S301 to S308:

S301: The initiator end determines an interaction tool based on a selection operation performed by the user through the service invoke entry.

S302: The service invoke entry of the initiator end requests the page management unit to trigger a page corresponding to the interaction tool.

S303: The page management unit of the initiator end requests a page-related resource from the server end, to present a corresponding interface.

S304: The page management unit of the initiator end sends an interaction message to the server end based on the selection operation performed by the user on the page.

S305: The server end sends the interaction message to a message service unit of a live streaming media platform.

S306: The message service unit of the live streaming media platform forwards the interaction message from the initiator end to the message parsing unit of the receiver end.

S307: After parsing the received interaction message, the message parsing unit of the receiver end requests the page management unit to trigger a corresponding interaction interface.

S308: The page management unit of the receiver end requests a page-related resource from the server end, to present the corresponding interface.

However, in the architecture of the live streaming system shown in FIG. 3, the server end needs to be independently deployed to maintain a specific page resource. If a service scenario changes, content in the server end needs to be adjusted. In this case, the development costs are high. In addition, in the architecture of the live streaming system shown in FIG. 3, the server end is limited to providing a service only for a specific service scenario, and cannot support access and customization of a third-party developer. Therefore, openness and scalability are poor.

To resolve the foregoing problem in a conventional network live streaming interaction process, an embodiment of this application provides a live streaming interaction method. In the method, a unified platform framework and an interface are provided, so that the third-party developer customizes an interaction process according to an actual live streaming interaction requirement. When the initiator end needs to initiate interaction, the initiator end only needs to obtain a static resource related to a tool from a static resource service, load a corresponding interface, and send an interaction message to the receiver end based on an operation of the initiator-end user. Based on the interaction message, the receiver end obtains a static resource related to the interaction from the static resource service, loads an interaction interface, and feeds back to the initiator end based on the operation performed by a receiver-end user. Based on a unified platform framework and an interface, the content of live streaming interaction can be enriched in the method, thereby improving compatibility, scalability, and openness of live streaming interaction. In addition, by using the unified platform framework and the interface, live streaming content and the interaction content are independent of each other, which can ensure that the live content and the interaction content do not interfere with each other, therefore security is higher.

In addition, when network live streaming is performed based on the architecture of the live streaming system shown in FIG. 2, interaction between the initiator end and the receiver end is limited to only one direction, in other words, interaction from the initiator end to the receiver end, and there is no back-and-forth interaction between ends. In addition, in the architecture of the live streaming system shown in FIG. 2, interaction is performed based on an interaction message in a format corresponding to an interaction type. Therefore, live streaming interaction that can be supported is relatively simple, for example, sending a gift, a card, an emoji, a shopping link, a bullet comment, or a hand raising. When conventional network live streaming is performed based on the architecture of the live streaming system shown in FIG. 3, interaction between the initiator end and the receiver end is usually performed in a form of a card or a link. After single interaction ends, entire interaction ends. Therefore, interactivity is relatively poor. However, based on the unified platform framework and interface provided in the embodiments of this application, live streaming interaction content can be enriched.

With reference to the accompanying drawings, the following describes a live streaming interaction method, an electronic device, and a system that are provided in embodiments of this application.

Figure 4:
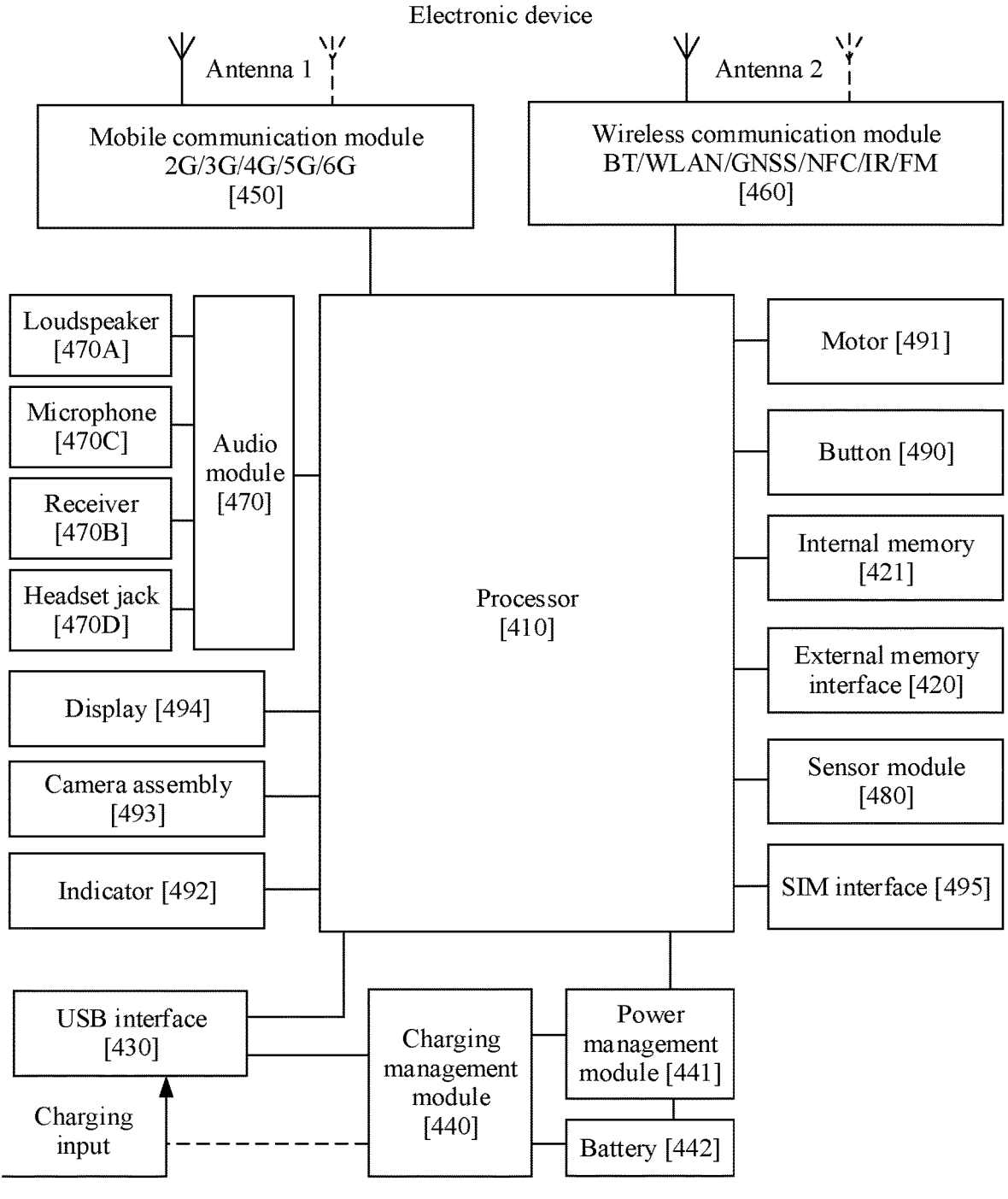
FIG. 4 is a schematic diagram of a hardware structure of an electronic device (for example, an initiator end or a receiver end) according to an embodiment of this application.

FIG. 4 is a schematic diagram of a hardware structure of an electronic device (for example, an initiator end or a receiver end) according to an embodiment of this application by using a smartphone as an example. As shown in FIG. 4, the electronic device may include a processor 410, a memory (including an external memory interface 420 and an internal memory 421), a Universal Serial Bus (USB) interface 430, a charging management module 440, a power management module 441, a battery 442, an antenna 1, an antenna 2, a mobile communication module 450, a wireless communication module 460, an audio module 470, a loud-speaker 470A, a receiver 470B, a microphone 470C, a headset jack 470D, a sensor module 480, a button 490, a motor 491, an indicator 492, a camera assembly 493, a display 494, a Subscriber Identity Module (SIM) card interface 495, and the like. The sensor module 480 may include a gyroscope sensor, an acceleration sensor, a magnetic sensor, a touch sensor, a fingerprint sensor, a pressure sensor, a barometric pressure sensor, a distance sensor, an optical proximity sensor, a temperature sensor, an ambient light sensor, a bone conduction sensor, and the like.

It may be understood that the structure illustrated in this embodiment of the present disclosure does not constitute a specific limitation on the electronic device. In some other embodiments of this application, the electronic device may include more or fewer components than those shown in the figure, or combine some components, or split some components, or have different component arrangements. The components shown in the figure may be implemented by hardware, software, or a combination of software and hardware.

The processor 410 may include one or more processing units. For example, the processor 410 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

A memory may be disposed in the processor 410, and is configured to store instructions and data. In some embodiments, the memory in the processor 410 is a cache. The memory may store instructions or data just used or cyclically used by the processor 410. If the processor 410 needs to use the instructions or the data again, the processor 410 may directly invoke the instructions or the data from the memory. This avoids repeated access and reduces a waiting time of the processor 410, thereby improving system efficiency.

In some embodiments, the processor 410 may include one or more interfaces. The interface may include an inter-integrated circuit (I2C) interface, an inter-integrated circuit sound (I2S) interface, a pulse-code modulation (PCM) interface, a universal asynchronous receiver/transmitter (UART) interface, a Mobile Industry Processor Interface (MIPI), a general-purpose input/output (GPIO) interface, a USB interface, and/or the like.

The charging management module 440 is configured to receive a charging input from a charger. The power management module 441 is configured to connect the battery 442, the charging management module 440, and the processor 410. The power management module 441 receives an input from the battery 442 and/or the charging management module 440, and supplies power to the processor 410, the internal memory 421, the display 494, the camera assembly 493, the wireless communication module 460, and the like.

A wireless communication function of the electronic device may be implemented by using the antenna 1, the antenna 2, the mobile communication module 450, the wireless communication module 460, the modem processor, the baseband processor, and the like.

The antenna 1 and the antenna 2 are configured to transmit and receive an electromagnetic wave signal. Each antenna of the electronic device may be configured to cover one or more communication frequency bands. Different antennas may be multiplexed to improve antenna utilization. For example, the antenna 1 may be multiplexed as a diversity antenna in a wireless local area network. In some other embodiments, the antenna may be used in combination with a tuning switch.

The mobile communication module 450 may provide a wireless communication solution including second-generation cellular network (2G)/third-generation cellular network (3G)/fourth-generation cellular network (4G)/fifth-generation cellular network (5G)/sixth-generation cellular network (6G) that is applied to the electronic device. The mobile communication module 450 may include at least one filter, a switch, a power amplifier, a low noise amplifier (LNA), and the like. The mobile communication module 450 may receive an electromagnetic wave by using the antenna 1, perform processing such as filtering and amplification on the received electromagnetic wave, and transmit the electromagnetic wave to the modem processor for demodulation. The mobile communication module 450 may further amplify a signal modulated by the modem processor, and convert the signal into an electromagnetic wave for radiation by using the antenna 1. In some embodiments, at least some functional modules of the mobile communication module 450 may be disposed in the processor 410. In some embodiments, at least some functional modules of the mobile communication module 450 and at least some modules of the processor 410 may be disposed in a same component.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low-frequency baseband signal obtained through demodulation to the baseband processor for processing. The low-frequency baseband signal is transferred to the application processor after being processed by the baseband processor. The application processor outputs a sound signal through an audio device (which is not limited to the loudspeaker 470A, the receiver 470B, or the like), or displays an image or a video through the display 494. In some embodiments, the modem processor may be an independent component. In some other embodiments, the modem processor may be independent of the processor 410, and is disposed in a same component as the mobile communication module 450 or another functional module.

The wireless communication module 460 may provide a wireless communication solution applied to the electronic device, for example, a wireless local area network (WLAN) (for example, a WI-FI network), BLUETOOTH (BT), a global navigation satellite system (GNSS), frequency modulation (FM), a near-field communication (NFC) technology, an infrared (IR) technology. The wireless communication module 460 may be one or more components integrating at least one communication processing module. The wireless communication module 460 receives an electromagnetic wave by using the antenna 2, performs frequency modulation and filtering processing on an electromagnetic wave signal, and sends a processed signal to the processor 410. The wireless communication module 460 may further receive a to-be-sent signal from the processor 410, perform frequency modulation and amplification on the signal, and convert the signal into an electromagnetic wave for radiation by using the antenna 2.

In some embodiments, in the electronic device, the antenna 1 and the mobile communication module 450 are coupled, and the antenna 2 and the wireless communication module 460 are coupled, so that the electronic device can communicate with a network and another device by using a wireless communication technology. The wireless communication technology may include a Global System for Mobile Communications (GSM), a general packet radio service (GPRS), code-division multiple access (CDMA), wideband CDMA (WCDMA), time-division CDMA (TD-SCDMA), Long-Term Evolution (LTE), new radio (NR), BT, a GNSS, a WLAN, NFC, FM, an IR technology, and/or the like. The GNSS may include a Global Positioning System (GPS), a global navigation satellite system (GLO-NASS), a BEIDOU navigation satellite system (BDS), a quasi-zenith satellite system (QZSS), a satellite-based augmentation system (SBAS), and/or the like.

The electronic device implements a display function by using the GPU, the display 494, the application processor, and the like. The GPU is a microprocessor for image processing and is connected to the display 494 and the application processor. The GPU is configured to perform mathematical and geometric computation, and render an image. The processor 410 may include one or more GPUs that execute program instructions to generate or change display information.

The display 494 is configured to display an image, a video, and the like. The display 494 includes a display panel. The display panel may be a liquid-crystal display (LCD), an organic light-emitting diode (OLED), an active-matrix OLED (AMOLED), a flexible light-emitting diode (FLED), a mini-light-emitting diode (mini-LED), a micro-light-emitting diode (micro-LED), a micro-OLED, a quantum dot light emitting diode (QLED), or the like. In some embodiments, the electronic device may include one or N displays 494, where N is a positive integer greater than 1.

In this embodiment of this application, the electronic device may render an interface (for example, a live streaming interface, an interface of a setting of an interaction parameter, an interface of a setting of a feedback parameter, or a feedback result presentation interface) by using the GPU, and display a corresponding interface by using the display 494.

The electronic device may implement a photographing function by using the ISP, the camera assembly 493, the video codec, the GPU, the display 494, the application processor, and the like.

The external memory interface 420 may be configured to connect an external storage card, for example, a micro Secure Digital (microSD) card or a solid-state disk, to expand a storage capability of the electronic device. The external storage card communicates with the processor 410 through the external memory interface 420, to implement a data storage function. For example, files such as music and a video are stored in the external storage card.

The internal memory 421 may be configured to store computer-executable program code. The computer-executable program code includes instructions. The internal memory 421 may include a program storage area and a data storage area. The program storage area may store an operating system, an application (for example, a sound playing function or an image playing function) required by at least one function, and the like. The data storage area may store data (for example, audio and video data), and the like generated when the electronic device is used. In addition, the internal memory 421 may include a high-speed random access memory, and may further include a nonvolatile memory, for example, at least one magnetic disk storage device, a flash memory device, or a Universal Flash Storage (UFS). The processor 410 runs the instructions stored in the internal memory 421 and/or the instructions stored in the memory disposed in the processor, to perform various function applications and data processing of the electronic device.

The electronic device may implement audio functions such as music playing or recording by using the audio module 470, the loudspeaker 470A, the receiver 470B, the microphone 470C, the application processor, and the like. For example working principles and functions of the audio module 470, the loudspeaker 470A, the receiver 470B, and the microphone 470C, refer to descriptions in a conventional technology.

The button 490 includes a power button, a volume button, and the like. The button 490 may be a mechanical button, or may be a touch button. The electronic device may receive a button input, and generate a button signal input related to a user setting and function control of the electronic device.

It should be noted that the hardware modules included in the electronic device shown in FIG. 4 are merely described as an example, and do not limit a specific structure of the electronic device. For example, if the electronic device is a PC, the electronic device may further include components such as a keyboard and a mouse.

In this application, the operating system of the electronic device (for example, the initiator end or the receiver end) may include but is not limited to an operating system such as Symbian®, Android®, Microsoft Windows®, Apple IOS®, Blackberry®, and Harmony®.

Figure 5:
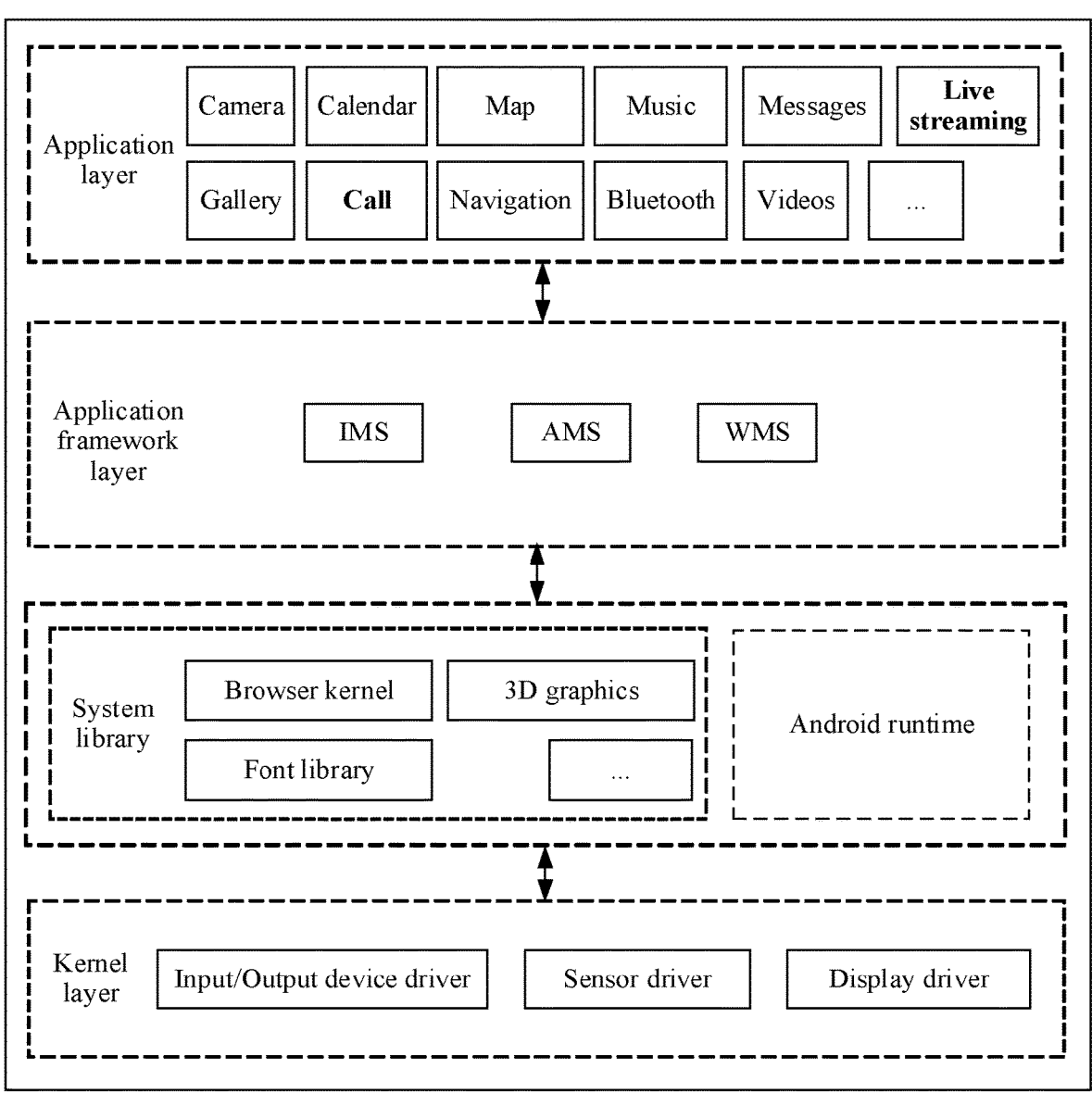
FIG. 5 is a schematic diagram of a software structure of an electronic device (for example, an initiator end or a receiver end) according to an embodiment of this application.

An electronic device including an Android® system of a layered architecture is used as an example. As shown in FIG. 5, software of the electronic device may be divided into several layers, and each layer has a clear role and task. The layers communicate with each other through a software interface. As shown in FIG. 5, a software structure of the electronic device (for example, the initiator end or the receiver end) may be divided into three layers from top to bottom: an application layer, an application framework layer, a system library, Android runtime, and a kernel layer (also referred to as a driver layer).

The application layer may include a series of application packages, for example, applications such as Camera, Gallery, Calendar, Call, Map, Navigation, Bluetooth, Music, Videos, Messages, and a live streaming application. For ease of description, the application is briefly referred to as an app below.

The application framework layer provides an application programming interface (API) and a programming framework for the application at the application layer. As shown in FIG. 5, the application framework layer may include a window manager service (WMS), an activity manager service (AMS), and an input event manager service (IMS). In some embodiments, the application framework layer may further include a content provider, a view system, a phone manager, a resource manager, a notification manager, and the like (not shown in FIG. 5).

The system library and the Android runtime include a function that needs to be invoked by the application framework layer, an Android core library, and an Android virtual machine. The system library may include a plurality of functional modules, for example, a browser kernel, three-dimensional (3D) graphics, and a font library.

The system library may include a plurality of functional modules, for example, a surface manager, a media library, a 3D graphics processing library (for example, OpenGL ES), and a two-dimensional (2D) graphics engine (for example, SGL).

The kernel layer is a layer between hardware and software. The kernel layer may include a display driver, an input/output device driver (for example, a keyboard, a touchscreen, a headset, a loudspeaker, or a microphone), a device node, a camera driver, an audio driver, a sensor driver, and the like. A user performs an input operation by using an input device. The kernel layer may generate a corresponding original input event based on the input operation, and store the original input event in the device node. The input/output device driver can detect an input event of the user. For example, the microphone may detect a voice given by the user.

It should be noted that FIG. 5 describes a software structure of the electronic device by using only the Android® system of a layered architecture as an example. A specific architecture of a software system of the electronic device is not limited in this application. For an example description of a software system of another architecture, refer to a conventional technology.

In an example, the live streaming interaction method provided in this embodiment of this application may be implemented based on the architecture of a live streaming system shown in FIG. 6. As shown in FIG. 6, the architecture of a live streaming system includes an initiator end (for example, a first device), a receiver end (for example, a second device), a live streaming media platform, and a static resource service platform.

The live streaming media platform includes a live streaming service unit and a message service unit. The live streaming service unit is configured to provide content such as audio, a video, and a message in a live streaming process. For example, the live streaming service unit is configured to forward a live stream (for example, a real-time communication (RTC) stream) corresponding to a live streaming image of a live streamer end to an audience end. The message service unit is responsible for message or signaling plane control in live streaming, for example, forwarding a chat message, forwarding a gift, and controlling muting of all attendees in a conference.

The static resource service platform is configured to manage a live streaming interaction service. The static resource service platform includes a resource import interface and a storage unit. The resource import interface is configured to receive customization of a third-party developer and import a static resource to the storage unit. For example, the third-party developer may upload a resource file of an interaction tool to the static resource service platform through the resource import interface. The storage unit is configured to store the tool resource file used for live streaming interaction, that is, the static resource.

The resource import interface may adapt to end devices with different hardware and software structures, for example, various types of end devices such as a smartphone, a PC, and a tablet, and end devices running various operating systems, such as Symbian®, Android®, Microsoft Windows®, Apple IOS®, Blackberry®, and Harmony®. For example, the static resource service platform may adaptively encapsulate the end devices with different hardware and software structures to provide a unified resource import interface for the third-party developer.

As shown in FIG. 6, the initiator end and the receiver end both include a live streaming media unit and a live streaming interaction unit.

The live streaming media unit is responsible for sending, based on an operation of a user, the live stream (for example, the RTC stream) corresponding to the live streaming image to the live streaming service unit of the live streaming media platform when a device performs live streaming; or the live streaming media unit is responsible for obtaining the live stream (for example, the RTC stream) corresponding to the live streaming image of the live streamer end from the live streaming service unit of the live streaming media platform when a device is the audience end, to present the corresponding live streaming image.

The live streaming interaction unit includes a tool management unit and a platform process management unit. The tool management unit is responsible for interaction in a network live streaming process, and is responsible for parsing the static resource, running the static resource, executing a live streaming interaction process based on an interaction service process indicated by the static resource, displaying an interface related to the static resource, and the like. The platform process management unit is responsible for obtaining a static resource corresponding to the interaction tool from the static resource service platform, managing an entry (for example, a platform interface) of the interaction tool in the network live streaming process, providing a tool option for the user to select, and starting a tool process based on the user's selection. For example, the platform process management unit may include a platform interface (not shown in FIG. 6) such as a SendData (String message) interface.

It may be understood that, based on the architecture of the live streaming system shown in FIG. 6, the third-party developer may customize, by using the resource import interface provided by the static resource service platform, the resource file of the live streaming interaction tool according to an actual live streaming interaction requirement, and import the resource file of the live streaming interaction tool into the static resource service platform in a form of the static resource. Based on the architecture of the live streaming system shown in FIG. 6, live streaming interaction with richer content and interactivity can be provided, thereby improving compatibility, scalability, and openness of the live streaming interaction.

In some embodiments, the tool management unit shown in FIG. 6 is further responsible for providing a relatively independent process environment to run the interaction tool independently. Therefore, based on the architecture of the live streaming system shown in FIG. 6, a mutually independent process environment can be provided for the live stream and an interaction message, to ensure that a live streaming process and an interaction process do not interfere with each other, therefore security is higher.

With reference to the architecture of the live streaming system shown in FIG. 6, the following describes a live streaming interaction method provided in this embodiment of this application by using an example in which the initiator end is the first device, the first device belongs to a first user, the receiver end is the second device, and the second device belongs to a second user.

Figure 7A:
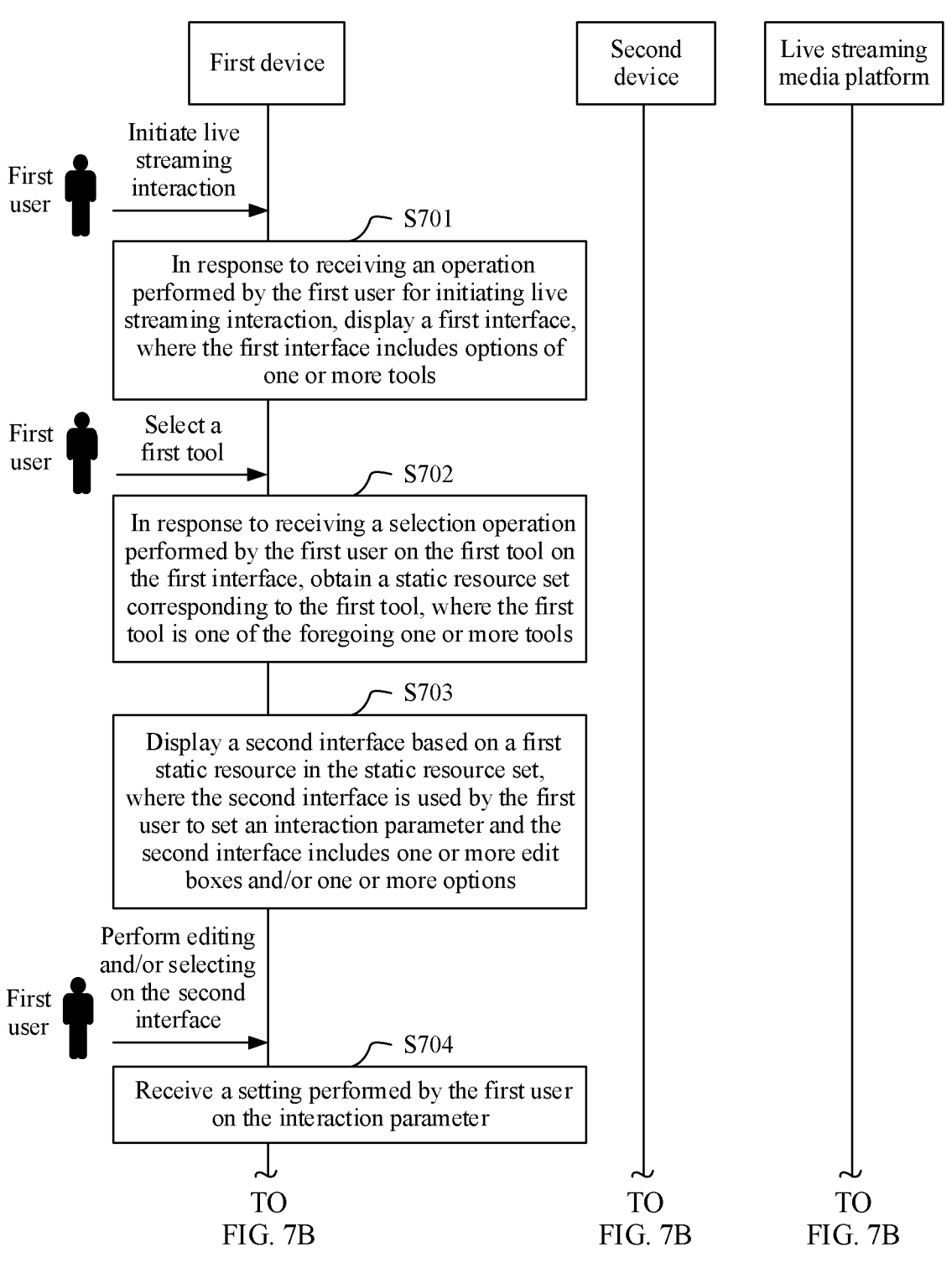
FIG. 7A and FIG. 7B are interaction diagrams of a live streaming interaction method according to an embodiment of this application.
Figure 7B:
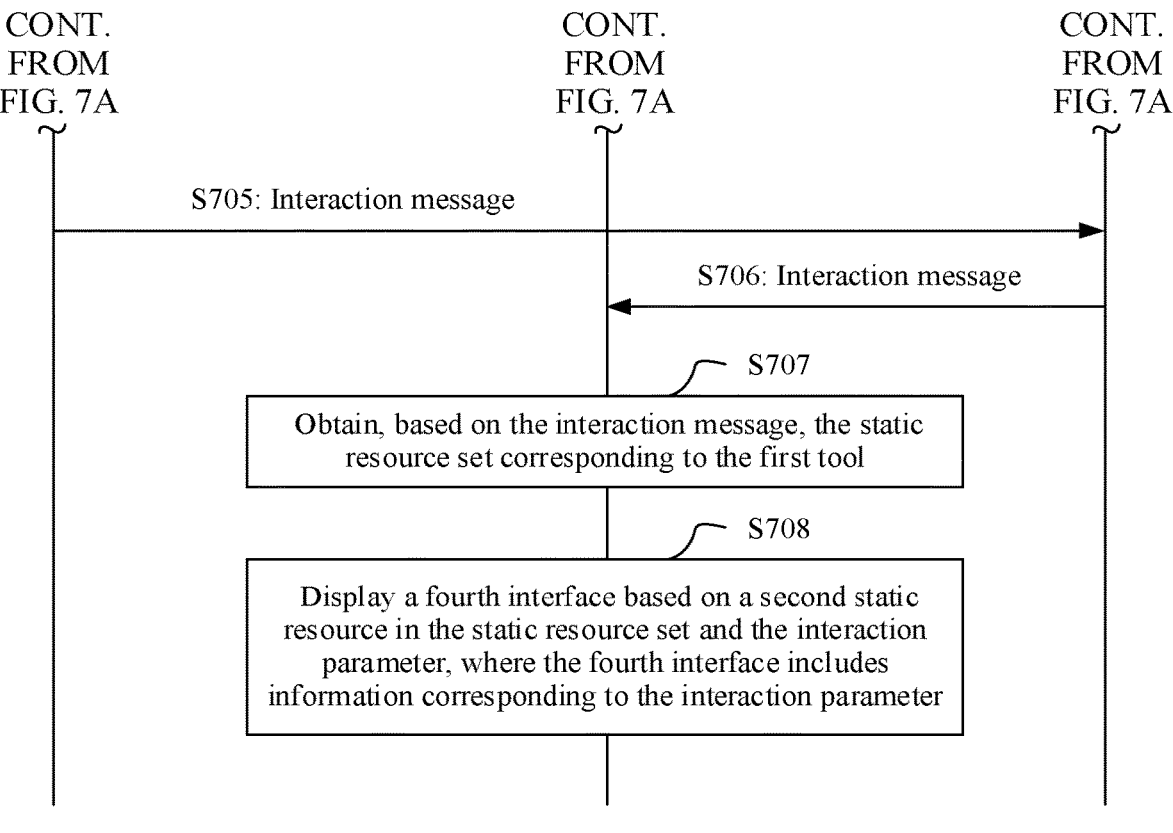

As shown in FIG. 7A and FIG. 7B, the live streaming interaction method provided in this embodiment of this application may include the following steps S701 to S708.

S701: In response to receiving an operation performed by the first user for initiating live streaming interaction, the first device displays a first interface. The first interface includes options of one or more tools.

The first interface is used by the user to perform a selection operation of the interaction tool, or is used to present the currently supported interaction tool to the user. For example, the first interface is a current live streaming interface, and the live streaming interface includes options of one or more tools.

In an example, the operation for initiating live streaming interaction may include but is not limited to an operation (such as single tapping or double tapping) performed on a virtual button used to initiate live streaming interaction, an operation performed on a drop-down list box or a hidden box, a preset operation performed on actual hardware (such as an operation of simultaneously pressing a power button and a volume button "+" of a mobile phone), a voice instruction, or the like. This is determined by an input device driver supported by the first device. This is not limited in this embodiment of this application.

S702: In response to receiving a selection operation performed by the first user on the first tool on the first interface, the first device obtains a static resource set corresponding to the first tool. The first tool is one of the foregoing one or more tools.

The first tool may correspond to one or more static resources, in other words, the static resource set corresponding to the first tool may include one or more static resources. The static resource indicates an interaction service process. For example, the static resource set includes a first static resource, a second static resource, and a third static resource.

In this embodiment of this application, if the static resource set corresponding to the first tool includes a plurality of static resources, there is a predefined invoking sequence among the plurality of static resources; and/or one or more of the plurality of static resources have a predefined invoking condition, for example, the static resource is invoked when a preset operation is received. For example, the preset operation may be a preset operation performed by the user on an interface corresponding to a previous static resource.

For example, it is assumed that the static resource set corresponding to the first tool includes the first static resource (for example, a resource 1), the second static resource (for example, a resource 2), and the third static resource (for example, a resource 3), and a predefined invoking sequence of the resource 1, the resource 2, and the resource 3 is the resource 1→the resource 2→the resource 3. After triggering the first tool, the first device sequentially performs static resource invoking and displays a subsequent corresponding interface in the invoking sequence of the resource 1→the resource 2→the resource 3.

For another example, it is assumed that the static resource set corresponding to the first tool includes a resource 1, a resource 2, and a resource 3, and predefined invoking conditions of the resource 1, the resource 2, and the resource 3 are respectively an operation 1, an operation 2, and an operation 3. After triggering the first tool, the first device invokes the resource 3 and displays a subsequent corresponding interface when receiving the operation 3 performed by the first user.

For another example, it is assumed that the static resource set corresponding to the first tool includes a resource 1, a resource 2, and a resource 3, a predefined invoking sequence of the resource 1, the resource 2, and the resource 3 is the resource 1→the resource 2→the resource 3, and a predefined invoking condition of the resource 2 is an operation 2. After triggering the first tool, the first device first invokes the resource 1, and then the first device continues to invoke the resource 2 if the first device receives the operation 2. If the first device does not receive the operation 2 after invoking the resource 1, the first device abandons invoking the resource 2 and invokes the resource 3. For example, the operation 2 is a preset operation performed by the user on a corresponding interface displayed when the first device invokes the resource 1.

The structure of the initiator end shown in FIG. 6 is used as an example. The tool management unit of the first device may request, from the platform process management unit, to obtain the static resource set corresponding to the first tool. Correspondingly, the platform process management unit of the first device obtains the static resource set corresponding to the first tool.

In a possible implementation, the first device (for example, the platform process management unit of the first device) may obtain, from a third device (for example, the static resource service platform (for example, the storage unit of the static resource service platform shown in FIG. 6)), the static resource set corresponding to the first tool. The static resource service platform stores a static resource set corresponding to at least one interaction tool.

For example, it is assumed that the first device starts a process of the first tool for the first time. The first device obtains, from the static resource service platform, the static resource set corresponding to the first tool. In some embodiments, further, the first device may locally store the static resource set that corresponds to the first tool and that is obtained from the static resource service platform.

In another possible implementation, the first device (for example, the platform process management unit of the first device) stores the static resource set corresponding to the first tool. The first device may locally obtain the static resource set corresponding to the first tool. For example, the static resource set that corresponds to the first tool and that is stored in the first device is obtained from the static resource service platform when the first device needs to trigger the first tool for the first time. The static resource service platform stores a static resource set corresponding to at least one interaction tool.

In an example, the selection operation performed on the first tool may include but is not limited to an operation (such as single tapping or double tapping) performed on a virtual button corresponding to the first tool, a voice instruction, or the like. This is determined by an input device driver supported by the first device. This is not limited in this embodiment of this application.

It should be noted that the method provided in this embodiment of this application may alternatively not include step S701, but is directly triggered by the selection operation performed by the first user on the first tool on the first interface. For example, if the first interface is the current live streaming interface, and the virtual button corresponding to the first tool is displayed on the live streaming interface, in response to receiving a tap operation performed by the first user on the virtual button corresponding to the first tool on the first interface, the first device obtains the static resource set corresponding to the first tool.

S703: The first device displays a second interface based on the first static resource in the static resource set. The second interface is used by the first user to set an interaction parameter. The second interface includes one or more edit boxes and/or one or more options.

In an example, the first static resource is a predefined first invoked static resource in the static resource set.

The structure of the initiator end shown in FIG. 6 is used as an example. The platform process management unit of the first device may display the second interface based on the obtained first static resource in the static resource set.

In a possible implementation, the first device (for example, the platform process management unit of the first device) displays the second interface based on the first static resource in the static resource set that may include the first device parses the first static resource, to obtain an interaction service process indicated by the first static resource. Then, the first device runs the first tool based on the interaction service process indicated by the first static resource. Finally, the first device displays a result of running the first tool, that is, displays an interface (in other words, the second interface) corresponding to the first static resource.

For example, the one or more edit boxes on the second interface may be used to but are not limited to edit one or more of the following: a question, a bullet comment, a comment, a message, a shopping link, a download link, and the like. The one or more options on the second interface may include but are not limited to one or more of the following: a candidate answer option, an emoji option, a card option, an animation option, a gift option, an action option (such as a hand raising), and the like.

S704: The first device receives a setting performed by the first user on the interaction parameter.

In an example, the first user may set the interaction parameter by using an editing operation and/or a selection operation on the second interface.

For example, the editing operation performed by the first user on the second interface may include but is not limited to an operation of editing information such as a question, a bullet comment, a comment, a message, a shopping link, or a download link performed by the first user on the second interface. The selection operation performed by the first user on the second interface may include but is not limited to an operation of selecting an option such as an emoji, a card, an animation, a gift, or an action (such as a hand raising) performed by the first user on the second interface.

In an implementation, after receiving the setting performed by the first user on the interaction parameter, the first device performs the following step S705.

In another implementation, after receiving the setting performed by the first user on the interaction parameter, the first device displays a third interface. The third interface includes a virtual button for confirming the setting of the interaction parameter and is used to determine, by tapping the virtual button, the setting performed by the first user on the interaction parameter, to trigger sending of an interaction message, in other words, perform the following step S705.

S705: The first device sends the interaction message to the live streaming media platform (in other words, a fourth device).

The architecture of the live streaming system and a device structure shown in FIG. 6 are used as examples. Step S705 includes the tool management unit of the first device sends the interaction message to the message service unit of the live streaming media platform.

In an example, the interaction message carries an identifier of the static resource set corresponding to the first tool and the interaction parameter. The identifier of the static resource set corresponding to the first tool is, for example, an ID (identity), or a storage address of the static resource set that corresponds to the first tool and that is on the static resource service platform.

The interaction parameter represents information edited and/or an option selected by the first user on the second interface. For example, it is assumed that the first user edits a question on the second interface. The interaction parameter represents the question. For another example, it is assumed that the first user edits a question and selects a plurality of options on the second interface. The interaction parameter represents the question and the plurality of options.

For example, the platform process management unit of the first device may invoke the tool management unit (for example, a platform interface of the tool management unit, such as a SendData (String message) interface), in other words, the platform process management unit may send the interaction message to the tool management unit of the first device, so that the tool management unit of the first device sends the interaction message to the message service unit of the live streaming media platform.

In a possible implementation, a format of the interaction message may be extensible markup language (XML), extensible message processing field protocol (XMPP), or the like. This is not limited in this application.

The interaction message in the XMPP format is used as an example. The interaction message may be shown as follows:

```
<message id="xc3S4-42" to="userid.hicloud.com"
from="userid.hicloud.com" type="chat" seq="155457744">
    <livecontrol xmlns="custom">
        <content>
            {"roomid":"943212","command":"livetools",
"attr":{"src":"parameter 1","data":"parameter 2"}}
        </content>
    </livecontrol>
</message>.
```

In the foregoing example of the interaction message, ""src": "parameter 1"" is the address of a static resource (in other words, the address of the static resource set corresponding to the first tool), and ""data":"parameter 2"" is the interaction parameter.

S706: The live streaming media platform forwards the interaction message from the first device to the second device.

The architecture of the live streaming system and the device structure shown in FIG. 6 are used as examples. The message service unit of the live streaming media platform forwards the interaction message from the first device to the platform process management unit of the second device.

S707: The second device obtains, based on the interaction message, the static resource set corresponding to the first tool.

The architecture of the live streaming system and the device structure shown in FIG. 6 are used as examples. The tool management unit of the second device may obtain, based on the interaction message, the static resource set corresponding to the first tool.

In a possible implementation, the second device may parse the interaction message to obtain the identifier of the static resource set corresponding to the first tool and the interaction parameter that are carried in the interaction message. Further, the second device may obtain, based on the identifier that is of the static resource set corresponding to the first tool and that is carried in the interaction message, the static resource set corresponding to the first tool.

For example, it is assumed that the interaction message carries the identifier of the static resource set corresponding to the first tool. The second device may locally search for, based on the identifier, the static resource set corresponding to the first tool, or obtain, based on the identifier, the static resource set corresponding to the first tool from the static resource service platform (such as the storage unit of the static resource service platform shown in FIG. 6).

For another example, it is assumed that the interaction message carries the address of the static resource set corresponding to the first tool. The second device may obtain, based on the address, the static resource set corresponding to the first tool from a corresponding path of the static resource service platform (such as the storage unit of the static resource service platform shown in FIG. 6).

S708: The second device displays a fourth interface based on the second static resource in the static resource set and the interaction parameter. The fourth interface includes information corresponding to the interaction parameter.

In an example, the second static resource is a predefined second invoked static resource in the static resource set.

The architecture of the live streaming system and the device structure shown in FIG. 6 are used as examples. The tool management unit of the second device may determine the fourth interface based on the second static resource in the static resource set and the interaction parameter, and display the fourth interface.

The fourth interface includes the information corresponding to the interaction parameter. For example, it is assumed that the interaction parameter represents a question edited by the first user. The fourth interface includes the question. For another example, it is assumed that the interaction parameter represents a multiple choice question and a plurality of candidate answer options that are edited by the first user. The fourth interface includes the multiple choice question and the plurality of candidate answer options.

In a possible implementation, the second device (such as the tool management unit of the second device) may parse the second static resource to obtain an interaction service process indicated by the second static resource. Then, the second device (such as the tool management unit of the second device) runs the first tool based on the interaction service process indicated by the second static resource, loads the interaction parameter, and determines the fourth interface. Finally, the second device displays the fourth interface.

As shown in FIG. 7A and FIG. 7B, based on the architecture of the live streaming system shown in FIG. 6, interaction from the initiator end to the receiver end can be implemented. Further, in some embodiments, based on the architecture of the live streaming system shown in FIG. 6, back-and-forth interaction between the initiator end, the receiver end, and the initiator end can be alternatively implemented.

Figure 8A:
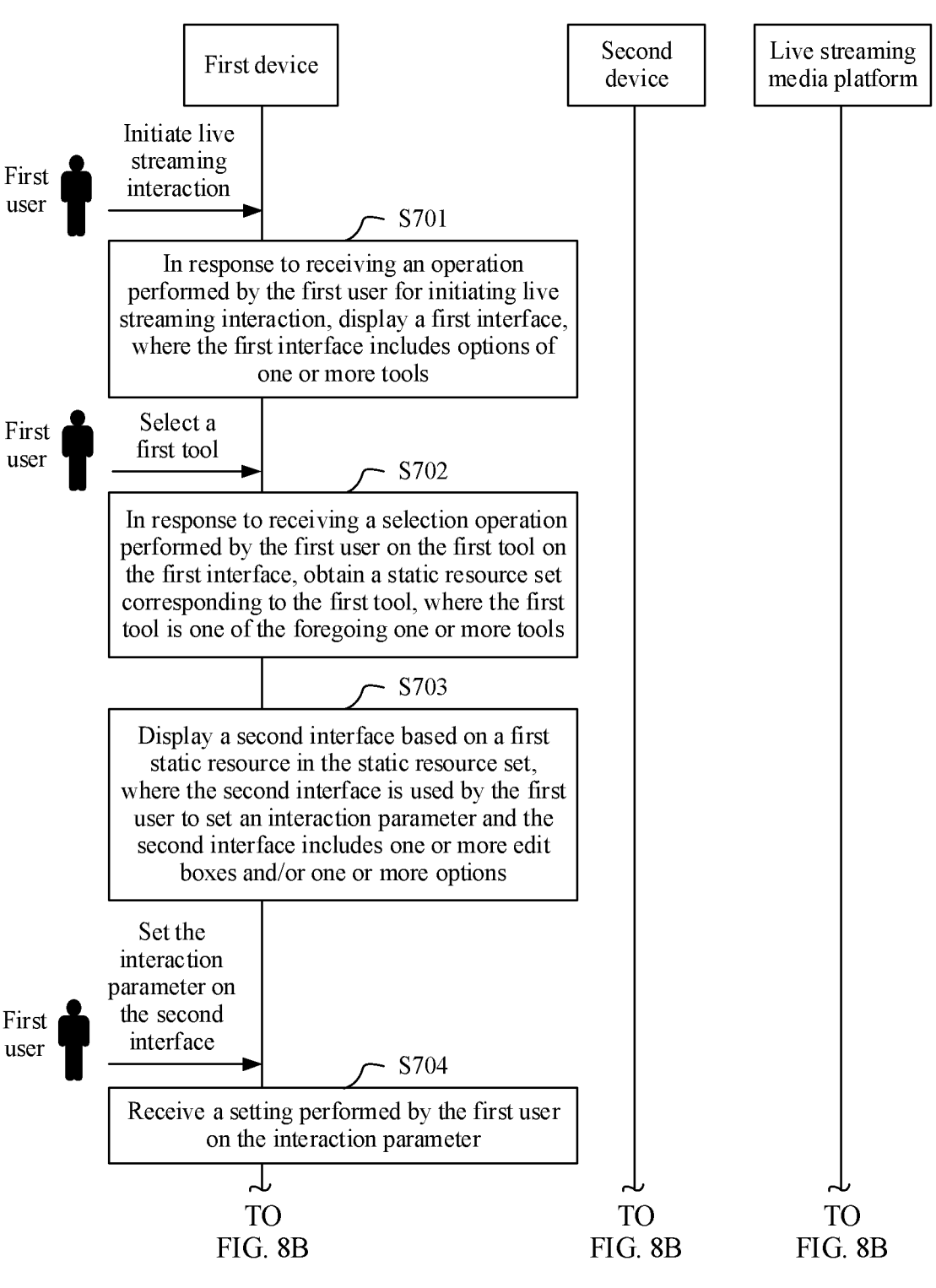
FIG. 8A and FIG. 8B are interaction diagrams of a live streaming interaction method according to an embodiment of this application.
Figure 8B:
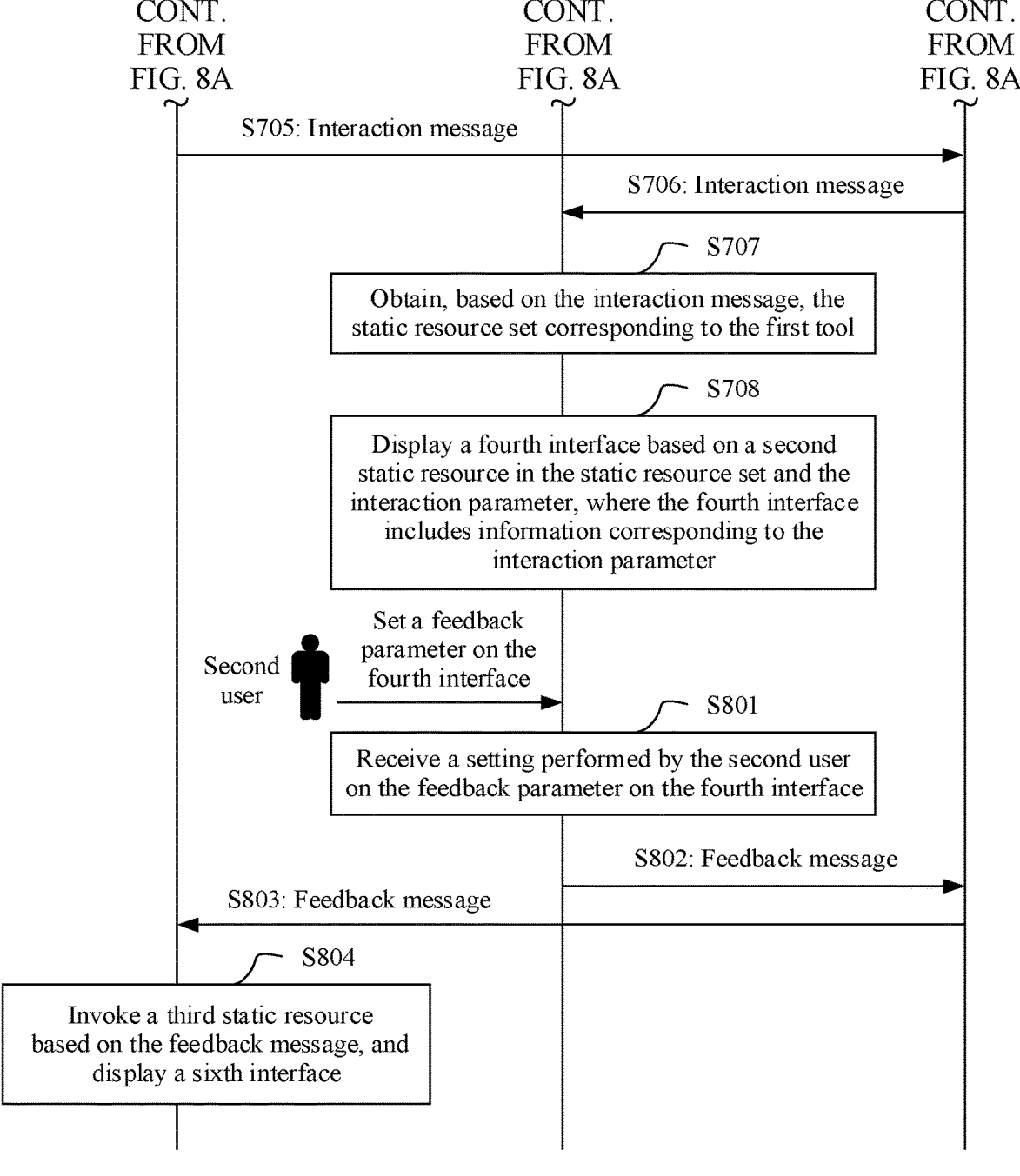

As shown in FIG. 8A and FIG. 8B, after step S708, the live streaming interaction method provided in this embodiment of this application may further include the following steps S801 to S804.

S801: The second device receives a setting performed by the second user on a feedback parameter on the fourth interface.

In an example, the fourth interface may further include one or more edit boxes and/or one or more options and is used by the second user to set the feedback parameter. In other words, the second user may set the feedback parameter by using an editing operation and/or a selection operation on the fourth interface.

For example, the editing operation performed by the second user on the fourth interface may include but is not limited to an operation of editing information such as an answer, a bullet comment, a comment, or a reply performed by the second user on the fourth interface. The selection operation performed by the second user on the fourth interface may include but is not limited to an operation of selecting an option such as an emoji, a card, an animation, a gift, or an action performed by the second user on the fourth interface.

In an implementation, after receiving the setting performed by the second user on the feedback parameter, the second device performs the following step S802.

In another implementation, after receiving the setting performed by the second user on the feedback parameter, the second device displays a fifth interface. The fifth interface includes a virtual button for confirming the feedback parameter and is used to determine, by tapping the virtual button, a response (in other words, the setting of the feedback parameter) of the second user to the interaction parameter, to trigger sending of a feedback message, in other words, perform the following S802.

S802: The second device sends the feedback message to the live streaming media platform.

The architecture of the live streaming system and the device structure shown in FIG. 6 are used as examples. Step S802 includes: The tool management unit of the second device sends the feedback message to the message service unit of the live streaming media platform.

The feedback message carries the feedback parameter. The feedback parameter represents information edited and/ or an option selected by the second user on the fourth interface. For example, it is assumed that the second user edits an answer to the question in the interaction parameter on the fourth interface. The feedback parameter represents the answer. For another example, it is assumed that the second user selects the plurality of candidate answer options on the fourth interface. The feedback parameter represents a selection result.

For example, the platform process management unit of the second device may invoke the tool management unit (for example, a platform interface of the tool management unit, such as a SendData (String message) interface), in other words, the platform process management unit may send the feedback message to the tool management unit of the second device, so that the tool management unit of the second device sends the feedback message to the message service unit of the live streaming media platform.

In a possible implementation, a format of the feedback message may be XML, an XMPP, or the like. This is not limited in this application.

A feedback message in the XMPP format is used as an example. The feedback message may be shown as follows:

```
<message id="xc3S4-42" to="userid.hicloud.com"
from="userid.hicloud.com" type="chat" seq="155457744">
    <livecontrol xmlns="custom">
        <content>
            {"roomid":"943212","command":"livetools",
"attr":{"data":"parameter 3"}}
        </content>
    </livecontrol>
</message>.
```

In the foregoing example of the feedback message, ""data": "parameter 3"" is the feedback parameter.

It may be understood that, because the first device has obtained the static resource set corresponding to the first tool in step S702, it may be considered that the static resource set corresponding to the first tool has been stored in the first device. Therefore, the feedback message may not include the address of the static resource (in other words, the address of the static resource set corresponding to the first tool), and includes only the feedback parameter.

S803: The live streaming media platform forwards the feedback message to the first device.

The architecture of the live streaming system and the device structure shown in FIG. 6 are used as examples. The message service unit of the live streaming media platform forwards the feedback message from the second device to the platform process management unit of the first device.

S804: The first device invokes the third static resource based on the feedback message, and displays a sixth interface.

The third static resource is a predefined third invoked static resource in the static resource set.

The architecture of the live streaming system and the device structure shown in FIG. 6 are used as examples. The tool management unit of the first device may invoke the third static resource based on the feedback message, determine the sixth interface with reference to the feedback parameter, and display the sixth interface.

In some embodiments, the tool management unit of the first device may parse the feedback message to obtain the feedback parameter carried in the feedback message. Further, the first device may invoke the third static resource, run the first tool based on an interaction service process indicated by the third static resource, load the feedback parameter, and determine the sixth interface. Further, the first device displays the sixth interface. In an example, the first device may invoke the third static resource based on the predefined invoking sequence.

According to the live streaming interaction method provided in this embodiment of this application, based on a unified platform framework (such as the static resource service platform shown in FIG. 6) and an interface (such as the resource import interface shown in FIG. 6), a third-party developer may customize an interaction process of the interaction tool according to an actual live streaming interaction requirement, and import the interaction process into the static resource service platform in a static resource manner.

Based on the unified platform framework and interface, when the initiator end of live streaming interaction needs to initiate interaction, the initiator end only needs to obtain a static resource related to a tool from a static resource service, load a corresponding interface, and send an interaction message to the receiver end based on an operation performed by the initiator-end user. Based on the interaction message, the receiver end of the live streaming interaction obtains the static resource related to the interaction tool from the static resource service, loads an interaction interface, and feeds back to the initiator end based on an operation performed by the receiver-end user. By using this solution, live streaming interaction may not be limited to conventional single interaction content (for example, sending a card, a gift, an emoji, a shopping link, a bullet comment, a hand raising, or an animation effect), but may adaptively enrich live streaming interaction content, thereby improving compatibility, scalability, and openness of live streaming interaction.

In addition, because processes that are responsible for an interaction service and a live streaming service are relatively independent, the live streaming interaction method provided in this embodiment of this application may further ensure independence between a service and a service through inter-process isolation or by providing a sandbox environment, and ensure that live streaming content and interaction content do not interfere with each other, therefore security is higher.

With reference to the architecture of the live streaming system shown in FIG. 6, the following describes a live streaming interaction method in an online class live streaming scenario provided in an embodiment of this application by using live streaming interaction in an online class live streaming process as an example.

For example, it is assumed that live streaming interaction in the online class live streaming process is interaction that in the online class live streaming process, a teacher sends an in-class test (such as a multiple choice question) to an online student by using a teacher-end device (in other words, the initiator end of live streaming interaction). The student receives the multiple choice question by using a student-end device (in other words, the receiver end of live streaming interaction) and makes a reply. The teacher-end device (in other words, the initiator end of live streaming interaction) presents a reply result based on the student's reply. The teacher-end device is the initiator end (in other words, the first device) shown in FIG. 6, the student-end device is the receiver end (in other words, the second device) shown in FIG. 6, the teacher is the first user, and the student is the second user.

It should be noted that, in this scenario example, the storage unit of the static resource service platform has already stored a static resource corresponding to an in-class test interaction tool. The static resource is customized by a third-party developer and imported to the static resource service platform through the resource import interface.

Figure 9A:
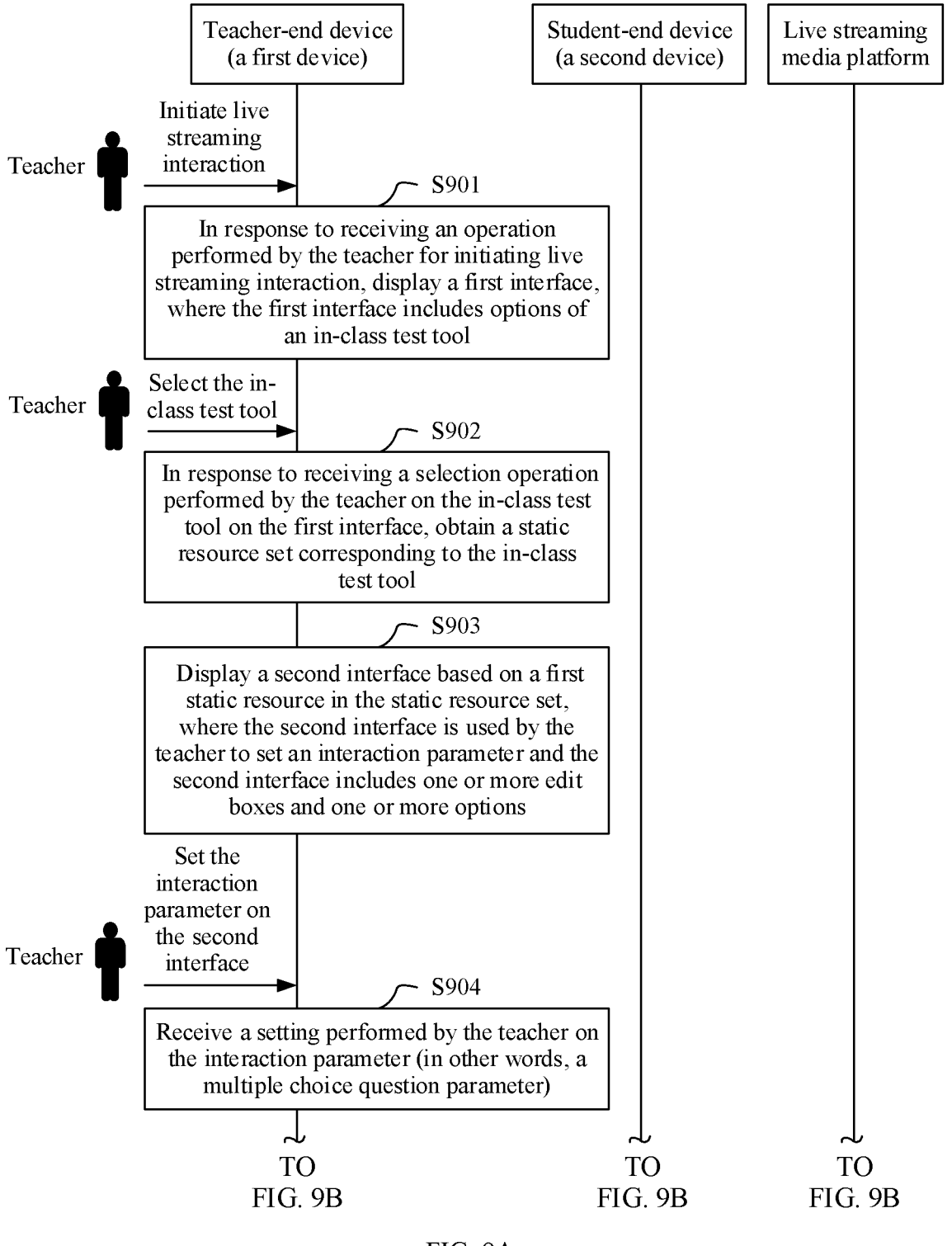

As shown in FIG. 9A and FIG. 9B, the interaction process of the live streaming interaction method in the online class live streaming scenario may include steps S901 to S908.

S901: In response to receiving an operation performed by the teacher for initiating live streaming interaction, the teacher-end device displays a first interface. The first interface includes an option of the in-class test tool.

The first interface is used by the teacher to perform a selection operation of the interaction tool, or is used to present the currently supported interaction tool to the teacher. For example, the first interface is a live streaming interface of a current online class. The live streaming interface includes options of one or more tools. The one or more tools include the in-class test tool.

Figure 10:
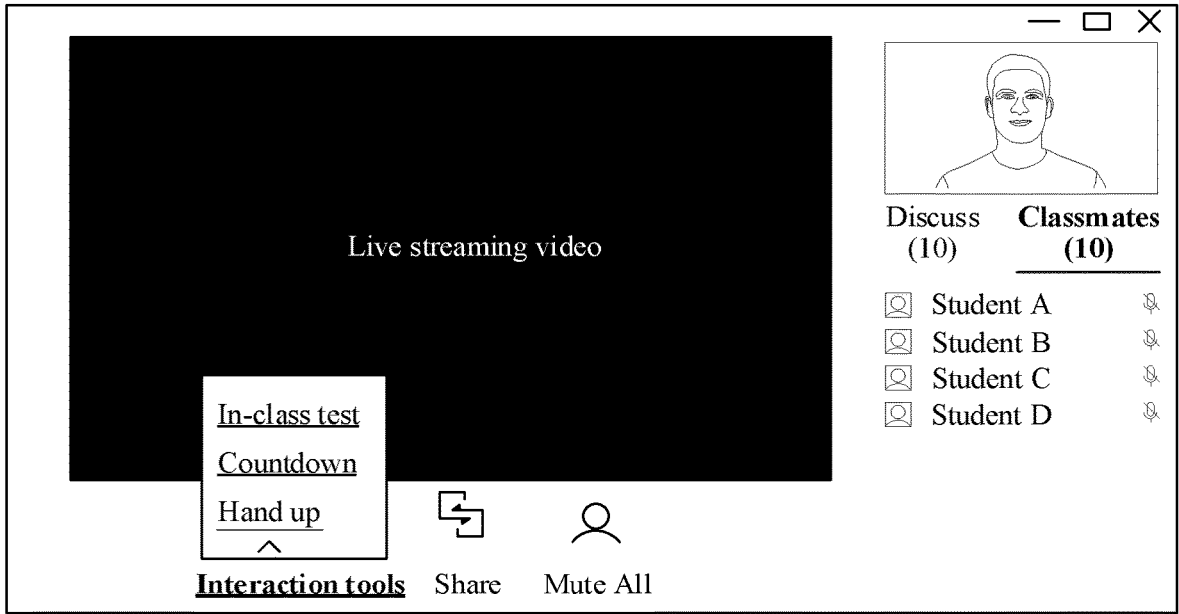
FIG. 10 is a schematic diagram of an online class live streaming interface (that is, a first interface) according to an embodiment of this application.

For example, FIG. 10 shows an example of a first interface according to an embodiment of this application. As shown in FIG. 10, the first interface is the live streaming interface of the current online class. The live streaming interface includes a drop-down list box of the interaction tool. The drop-down list box includes three tools: an in-class test, a countdown, and a hand raising.

S902: In response to receiving a selection operation performed by the teacher on the in-class test tool on the first interface, the teacher-end device obtains a static resource set corresponding to the in-class test tool.

The static resource set corresponding to the in-class test tool may include a plurality of static resources. The plurality of static resources indicates a plurality of interaction service processes.

The in-class test tool is used as an example. The static resource set includes a first static resource, a second static resource, and a third static resource. For example, for the in-class test tool, the first static resource indicates an interaction parameter process. The second static resource indicates an interaction interface presentation process. The third static resource indicates a feedback result presentation process.

In an example, a predefined invoking sequence of the static resource in the static resource set corresponding to the in-class test tool is: the first static resource→the second static resource→the third static resource. After triggering the in-class test tool, the teacher-end device sequentially invokes the static resource and displays a subsequent corresponding interface based on the invoking sequence of the first static resource→the second static resource→the third static resource.

In another example, one or more static resources in the static resource set corresponding to the in-class test tool have a predefined invoking condition, for example, the static resource is invoked when a preset operation is received. For example, the preset operation may be a preset operation performed on an interface corresponding to a previous static resource.

In some embodiments, the teacher-end device may obtain, from the static resource service platform (such as the storage unit of the static resource service platform shown in FIG. 6), the static resource set corresponding to the in-class test tool.

For example, it is assumed that the teacher-end device starts a process of the in-class test tool for the first time. The teacher-end device obtains, from the static resource service platform, the static resource set corresponding to the in-class test tool. In some embodiments, further, the teacher-end device may locally store the static resource set that corresponds to the in-class test tool and that is obtained from the static resource service platform.

In some other embodiments, the teacher-end device (such as the platform process management unit of the teacher-end device) stores the static resource set corresponding to the in-class test tool. The teacher-end device may locally obtain the static resource set corresponding to the in-class test tool. For example, the static resource set that corresponds to the in-class test tool and that is stored in the teacher-end device is obtained from the static resource service platform when the teacher-end device needs to trigger the in-class test tool for the first time. The static resource service platform stores a static resource set corresponding to at least one interaction tool.

S903: The teacher-end device displays a second interface based on the first static resource in the static resource set. The second interface is used by the teacher to edit content of the multiple choice question. The second interface includes one or more edit boxes and one or more options.

In an example, the first static resource is a predefined first invoked static resource in the static resource set.

In a possible implementation, the teacher-end device (such as the platform process management unit of the teacher-end device) displays the second interface based on the first static resource in the static resource set that may include the teacher-end device parses the first static resource to obtain an interaction service process indicated by the first static resource. Then, the teacher-end device runs the in-class test tool based on the interaction service process indicated by the first static resource. Also, the teacher-end device displays a result of running the in-class test tool, that is, displays an interface (in other words, the second interface) corresponding to the first static resource.

In an in-class test interaction scenario, the one or more edit boxes on the second interface may be used to but are not limited to edit one or more of the following: a multiple choice question, a blank filling question, a true or false question, a short answer question, and the like. The one or more options on the second interface correspond to one or more question types, or one or more candidate answers.

Figure 11:
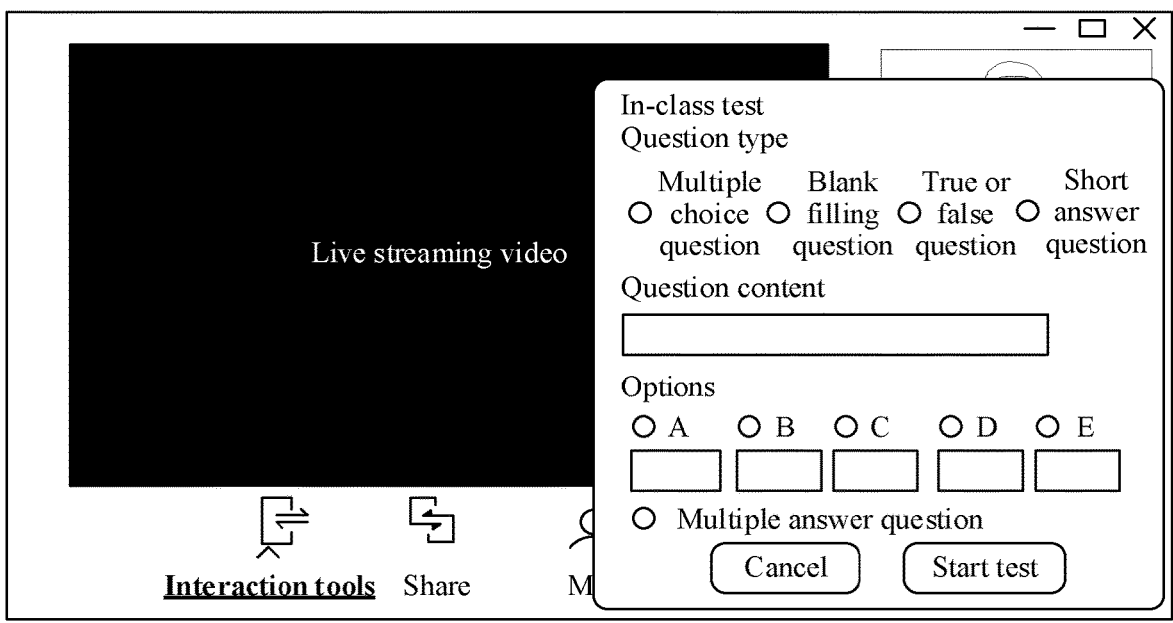
FIG. 11 is a schematic diagram of a question editing interface (that is, a second interface) according to an embodiment of this application.

For example, after parsing the static resource and running the interaction tool, the teacher-end device displays a test question editing interface (for example, the second interface) shown in FIG. 11. The question editing interface (that is, the second interface) includes a question type option (such as a multiple choice question option, a blank filling question option, a true or false question option, and a short answer question option shown in FIG. 11) and the plurality of edit boxes (such as an edit box for editing a question and an edit box for editing an answer shown in FIG. 11).

It should be noted that FIG. 11 is merely an example of a multiple choice question editing interface. A specific type of a test question is not limited in this embodiment of this application, for example, may be alternatively a blank-filling question, a true or false question, or a short-answer question. In addition, specific content and a display form of the second interface are not limited in this embodiment of this application. For example, the second interface may further include an option and/or an edit box used to set a question answering time.

S904: The teacher-end device receives a setting performed by the teacher on an interaction parameter (in other words, a multiple choice question parameter).

In an example, the teacher may set the interaction parameter by using an editing operation and/or a selection operation on the second interface (such as the question editing interface shown in FIG. 11).

Figure 12:
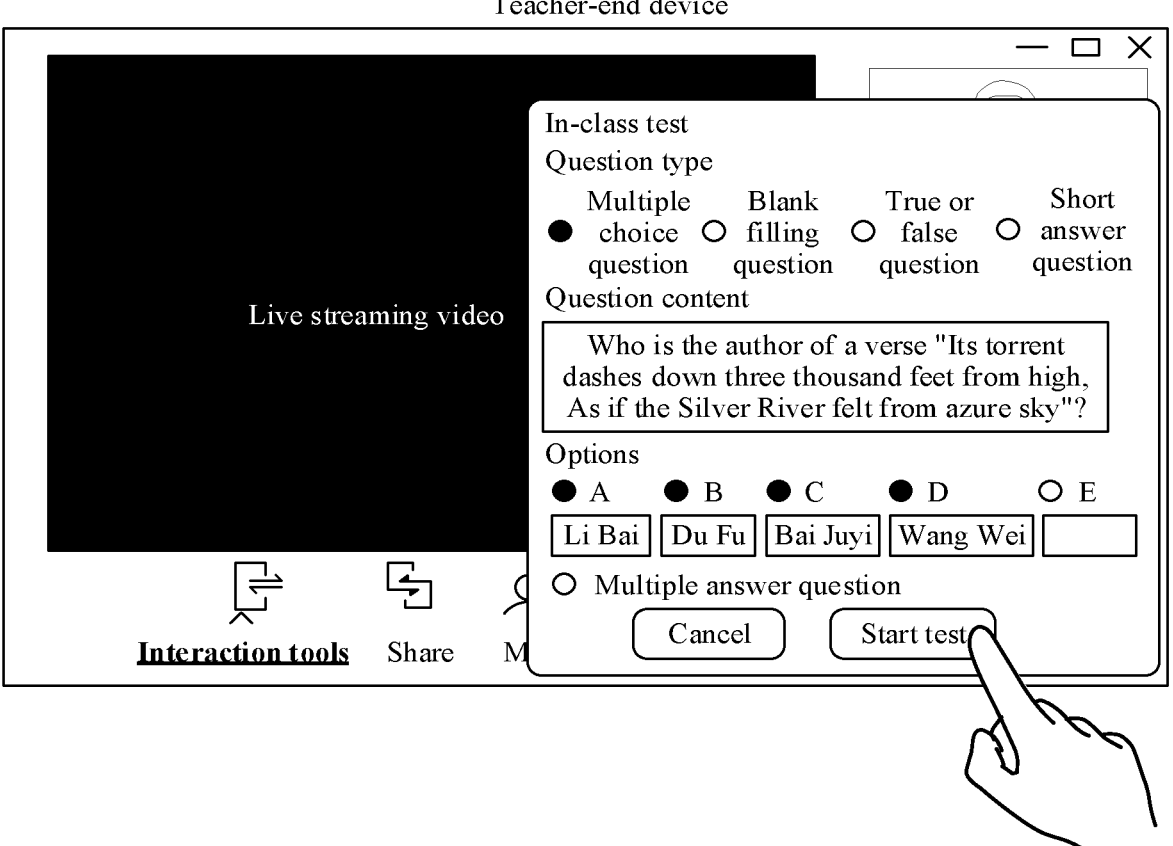
FIG. 12 is a schematic diagram of an interaction parameter confirmation interface (that is, a third interface) according to an embodiment of this application.

For example, the teacher may select a question type, edit a question, and edit a candidate answer option on the interface shown in FIG. 11. For example, the teacher selects the multiple choice question option on the question editing interface, and edits a multiple choice question and candidate answer options. The multiple choice question is "Who is the author of a verse "Its torrent dashes down three thousand feet from high, As if the Silver River felt from azure sky"?" The candidate answer options include "A (Li Bai), B (Du Fu), C (Bai Juyi), and D (Wang Wei)". The question editing interface is shown in FIG. 12.

In an implementation, after receiving the setting performed by the teacher on the interaction parameter (such as the multiple choice question parameter), the teacher-end device directly performs the following step S905.

In another implementation, after receiving the setting performed by the teacher on the interaction parameter (such as the multiple choice question parameter), the teacher-end device displays a third interface. The third interface includes a virtual button (such as a "start test" button shown in FIG. 12) for confirming the interaction parameter and is used to determine, by tapping the virtual button, the setting performed by the teacher on the interaction parameter, to trigger sending of an interaction message.

S905: The teacher-end device sends the interaction message to the live streaming media platform.

In an example, the interaction message carries an identifier of the static resource set corresponding to the first tool (such as the in-class test tool) and the interaction parameter (such as the multiple choice question parameter). The identifier of the static resource set corresponding to the first tool (such as the in-class test tool) is, for example, an ID, or a storage address of the static resource set that corresponds to the in-class test tool and that is on the static resource service platform.

The interaction parameter represents information edited and/or an option selected by the teacher on the second interface (such as the question editing interface shown in FIG. 12). As shown in FIG. 12, the teacher edits the multiple choice question and the plurality of candidate answer options on the second interface. The interaction parameter represents the multiple choice question and the plurality of candidate answer options.

The interaction message includes the multiple choice question parameter and the interaction message is in an XMPP format that are used as examples. The interaction message may be shown as follows:

```
<message id="xc3S4-42" to="userid.hicloud.com"
from="userid.hicloud.com" type="chat" seq="155457744">
    <livecontrol xmlns="custom">
        <content>
            {"roomid":"943212","command":"livetools",
    "attr":{"src":"https://hicloud.com/static/livetools/selection.zip","data":
"Who is the author of a verse "Its torrent dashes down three thousand feet
from high, As if the Silver River felt from azure sky"?, A (Li Bai), B (Du
Fu), C (Bai Juyi), D (Wang Wei)"}}
        </content>
    </livecontrol>
</message>.
```

In the foregoing interaction message example, src is the address of the static resource (in other words, the address of the static resource set corresponding to the in-class test tool), for example, https://hicloud.com/static/livetools/selection-.zip. data is a multiple choice parameter. The multiple choice parameter includes the multiple choice question and the four candidate answer options.

S906: The live streaming media platform forwards the interaction message from the teacher-end device to the student-end device.

S907: The student-end device obtains, based on the interaction message, the static resource set corresponding to the in-class test tool.

In a possible implementation, the student-end device may parse the interaction message to obtain the identifier of the static resource set corresponding to the in-class test tool (in other words, the first tool) and the interaction parameter that are carried in the interaction message. Further, the student-end device may obtain, based on the identifier that is of the static resource set corresponding to the in-class test tool (in other words, the first tool) and that is carried in the interaction message, the static resource set corresponding to the in-class test tool (in other words, the first tool).

For example, it is assumed that the interaction message carries the identifier of the static resource set corresponding to the in-class test tool. The student-end device may locally search for, based on the identifier, the static resource set corresponding to the in-class test tool, or obtain, based on the identifier, the static resource set corresponding to the in-class test tool from the static resource service platform (such as the storage unit of the static resource service platform shown in FIG. 6).

For another example, it is assumed that the interaction message carries the address (for example, https://hicloud-.com/static/livetools/selection.zip) of the static resource set corresponding to the in-class test tool. The student-end device may obtain, based on the address, the static resource set corresponding to the in-class test tool from a corresponding path of the static resource service platform (such as the storage unit of the static resource service platform shown in FIG. 6).

S908: The student-end device displays a fourth interface based on the second static resource in the static resource set and the interaction parameter (in other words, the multiple choice question parameter). The fourth interface includes information corresponding to the interaction parameter (in other words, the multiple choice question parameter).

In an example, the second static resource is a predefined second invoked static resource in the static resource set. The in-class test tool is used as an example. The second static resource indicates the interaction interface presentation process.

The fourth interface includes the information corresponding to the interaction parameter. For example, it is assumed that the interaction parameter represents the multiple choice question and the plurality of candidate answer options that are edited by the teacher. The fourth interface includes the multiple choice question and the plurality of candidate answer options.

In a possible implementation, the student-end device (such as the tool management unit of the student-end device) may parse the second static resource to obtain an interaction service process indicated by the second static resource. Then, the student-end device runs the in-class test tool based on the interaction service process indicated by the second static resource, loads the interaction parameter, and determines the fourth interface. Also, the student-end device displays the fourth interface.

Figure 13:
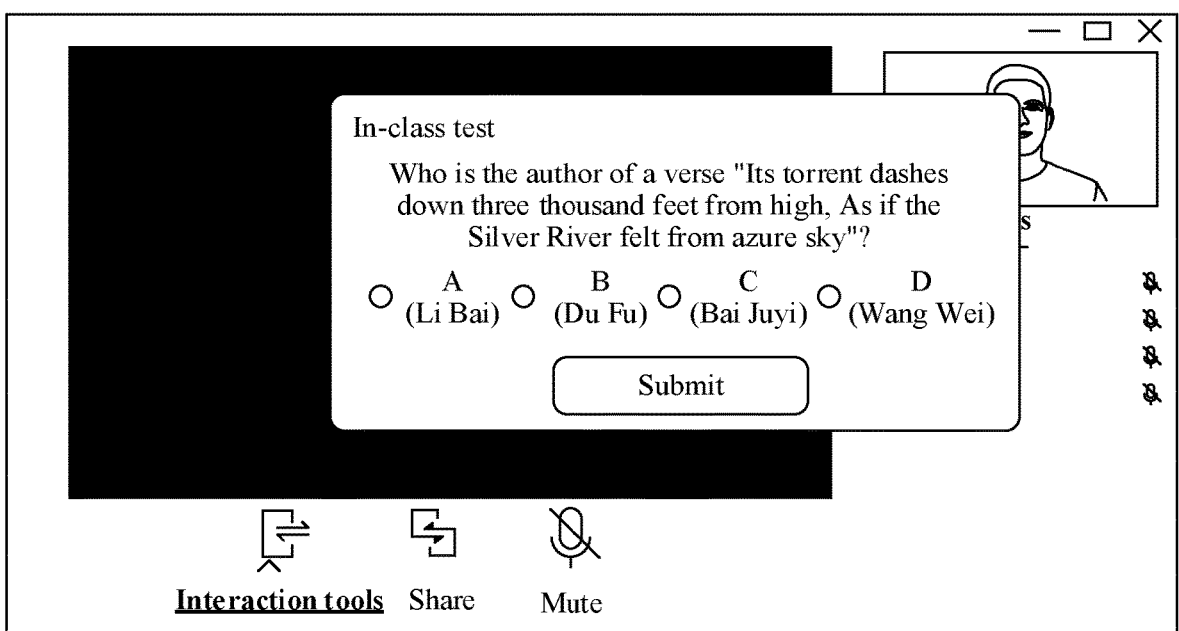
FIG. 13 is a schematic diagram of an answer sheet interface (that is, a fourth interface) according to an embodiment of this application.

For example, after parsing the static resource and running the interaction tool, the student-end device displays an answer sheet interface (that is, the fourth interface) shown in FIG. 13. The answer sheet interface (that is, the fourth interface) includes the multiple choice question (for example, as shown in FIG. 13, who is the author of a verse "Its torrent dashes down three thousand feet from high, As if the Silver River felt from azure sky"?) and the plurality of candidate answer options (for example, as shown in FIG. 13: A (Li Bai), B (Du Fu), C (Bai Juyi), and D (Wang Wei)).

It should be noted that FIG. 13 is merely an example of the answer sheet interface. Specific content and a display form of the answer sheet are not limited in this embodiment of this application.

S909: The student-end device receives a setting performed by the student on a feedback parameter on the fourth interface.

In an example, the fourth interface may further include one or more edit boxes and/or one or more options and is used by the student to set the feedback parameter. In other words, the student may set the feedback parameter by using an editing operation and/or a selection operation on the fourth interface.

Figure 14:
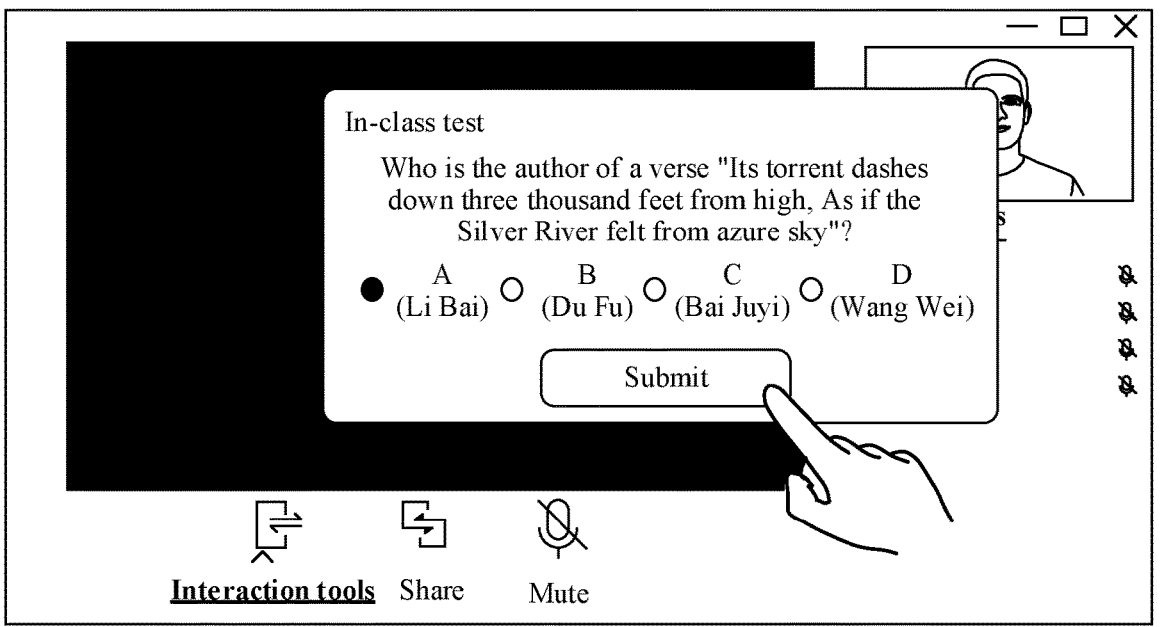
FIG. 14 is a schematic diagram of a feedback parameter confirmation interface (that is, a fifth interface) according to an embodiment of this application.

The answer sheet interface (for example, the fourth interface) including the multiple choice question and the plurality of candidate answer options are used as examples. The student may set the feedback parameter by using the selection operation on the answer sheet interface (for example, the fourth interface). As shown in FIG. 14, the student-end device receives the selection operation performed by the student on a candidate answer option A on the answer sheet interface (that is, the fourth interface).

In an implementation, after receiving the setting about the feedback parameter, the student-end device directly performs the following step S910.

In another implementation, after receiving the setting of the feedback parameter, the student-end device displays a fifth interface. The fifth interface includes a virtual button (such as a "submit" button shown in FIG. 14) for confirming the setting of the feedback parameter and is used to determine, by tapping the virtual button, a response of the student to the interaction parameter (for example, the setting of the feedback parameter), to trigger sending of a feedback message.

S910: The student-end device sends the feedback message to the live streaming media platform.

The feedback message carries the feedback parameter. The feedback parameter represents information edited by the student and/or an option selected by the student on the fourth interface. The interface shown in FIG. 14 is used as an example. The feedback message represents a selection result of the student.

The feedback message includes the selection result and the feedback message is in an XMPP format that are used as examples. The feedback message may be shown as follows:

```
<message id="xc3S4-42" to="userid.hicloud.com"
from="userid.hicloud.com" type="chat" seq="155457744">
    <livecontrol xmlns="custom">
        <content>
            {"roomid":"943212","command":"livetools",
"attr":{"data":"A"}}
        </content>
    </livecontrol>
</message>.
```

In the foregoing example of the feedback message, data is the selection result (for example, the feedback parameter), for example, option A.

S911: The live streaming media platform forwards the feedback message to the teacher-end device.

S912: The teacher-end device invokes the third static resource based on the feedback message, and displays a sixth interface.

The third static resource is a predefined third invoked static resource in the static resource set. The in-class test tool is used as an example. The third static resource indicates the feedback result presentation process.

In an example, the platform process management unit of the teacher-end device may invoke the tool management unit (such as the platform interface of the tool management unit, for example, a getData interface) in other words, the platform process management unit may send a feedback result to the tool management unit of the teacher-end device.

For example, the feedback result may be sent by the tool management unit to the platform process management unit in a form of <uid, value>, so that the platform process management unit performs more information processing and presentation. uid is an ID of a user, value represents the feedback parameter in the feedback message, and value may be customized by a third-party developer according to a requirement. For example, value may include data in the feedback message in the XMPP format. For example, the feedback result may be {(ID1, A), (ID2, B), (ID3, C), (ID4, D)}, and represents that a user indicated by ID 1 selects the option A, a user indicated by ID 2 selects an option B, a user indicated by ID 3 selects an option C, and a user indicated by ID 4 selects an option D.

In some embodiments, the teacher-end device (such as the tool management unit of the teacher-end device) may parse the feedback message to obtain the feedback parameter carried in the feedback message. Further, the teacher-end device may invoke the third static resource, run the third static resource based on an interaction service process indicated by the third static resource, load the feedback parameter, and determine the sixth interface. Finally, the teacher-end device displays the sixth interface. In an example, the teacher-end device may invoke the third static resource based on the predefined invoking sequence.

In an example, after parsing the feedback message and invoking the third static resource, the teacher device presents a feedback parameter of each student.

In another example, after parsing a feedback message of each student-end device, and invoking the third static resource, the teacher-end device presents the feedback result of the student in a statistical form.

Figure 15:
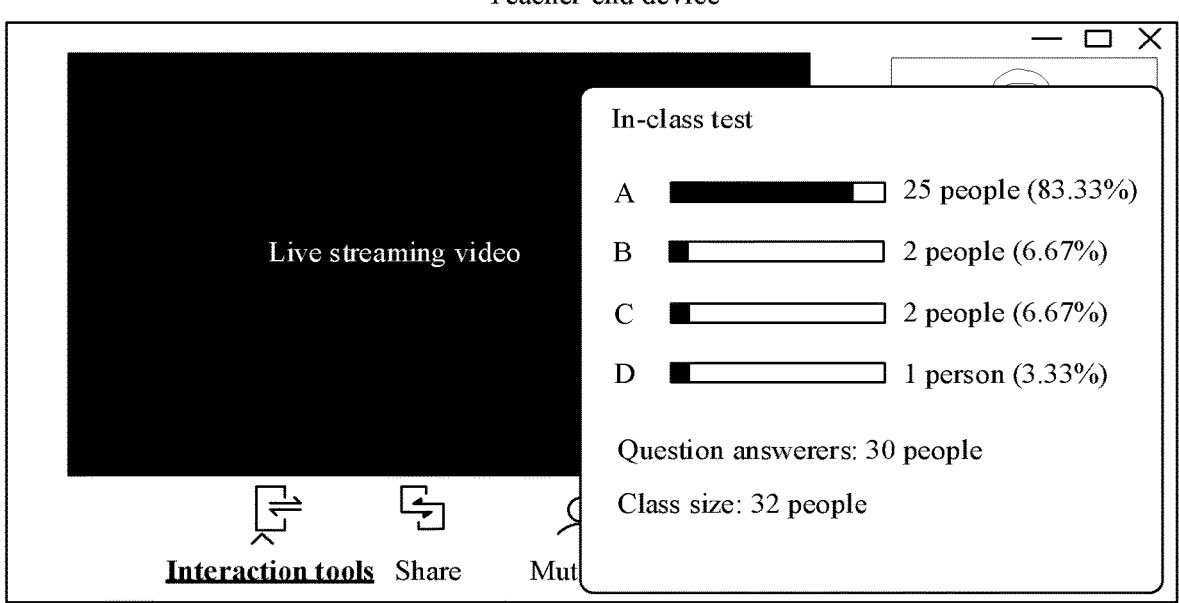
FIG. 15 is a schematic diagram of a feedback result presentation interface (that is, a sixth interface) according to an embodiment of this application.

For example, the feedback result of the student is presented in a statistical form of a name of a student who selects each candidate answer option. For another example, the feedback result of the student is presented in a statistical form of a quantity of students who select each candidate answer option. As shown in FIG. 15, there are 30 students participating in the in-class test (class size is 32), and there are 25 people, 2 people, 2 people, and 1 person who select A, B, C, and D respectively. A specific presentation form of the feedback result is not limited in this embodiment of this application, and is determined by the static resource customized by the third-party developer.

It may be understood that, to implement functions in any one of the foregoing embodiments, an electronic device (for example, the first device, the second device, or the third device) includes a corresponding hardware structure and/or software module for performing each function. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the electronic device (for example, the first device, the second device, or the third device) may be divided into functional modules. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into modules is an example, and is merely a logical function division. In actual implementation, another division manner may be used.

It should be understood that modules in the electronic device (for example, the first device, the second device, or the third device) may be implemented in a form of software and/or hardware. This is not limited herein. In other words, the electronic device is presented in a form of the functional module. The "module" herein may be an application-specific integrated circuit (ASIC), a circuit, a processor that executes one or more software or firmware programs, a memory, an integrated logic circuit, and/or another component that can provide the foregoing functions.

In an optional manner, when software is used for implementing data transmission, the data transmission may be completely or partially implemented in a form of a computer program product. The computer program product includes one or more computer instructions. When the computer program instructions are loaded and executed on a computer, all or some of the procedures or functions according to embodiments of this application are implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid-state disk (SSD)), or the like.

The methods or algorithm steps described with reference to embodiments of this application may be implemented in a hardware manner, or may be implemented in a manner of executing software instructions by the processor. The software instructions may include a corresponding software module. The software module may be stored in a random-access memory (RAM) memory, a flash memory, a read-only memory (ROM) memory, an erasable programmable ROM (EPROM) memory, an electrically-erasable programmable ROM (EEPROM) memory, a register, a hard disk, a removable hard disk, a CD-ROM, or a storage medium in any other form well-known in the art. For example, a storage medium is coupled to a processor, so that the processor can read information from the storage medium and write information into the storage medium. In an example, the storage medium may be alternatively a component of the processor. The processor and the storage medium may be disposed in an ASIC. In addition, the ASIC may be located in an electronic device or an SSD. Certainly, the processor and the storage medium may alternatively exist in the electronic device as discrete components.

Based on the foregoing descriptions of the implementations, a person skilled in the art may clearly understand that for the purpose of convenient and brief descriptions, division into the functional modules is merely used as an example for description. In actual application, the foregoing functions can be allocated to different functional modules for implementation according to a requirement. In other words, an inner structure of an apparatus is divided into different functional modules, to implement all or some of the functions described above.

What is claimed is:

1. A method for data interaction during live streaming, comprising:

obtaining, by an initiator end apparatus from a third device that manages an interaction service, a static resource set, wherein the static resource set is customized according to an interaction requirement;

displaying, by an initiator end apparatus, a second interface based on a first static resource that is in the static resource set and that corresponds to a first tool in response to receiving a selection operation of a first user on the first tool on a first interface, wherein the first interface is a live streaming interface including options of one or more tools, wherein the second interface is for setting, by the first user, an interaction parameter within the first tool, wherein the interaction parameter represents at least one of information edited by the first user or an option selected by the first user, wherein the first static resource indicates a first interaction service process, and wherein the second interface comprises one or more first edit boxes or one or more first options;

displaying, by the initiator end apparatus, a third interface based on the setting on the interaction parameter on the second interface, wherein the third interface comprises a first button that is to confirm the setting on the interaction parameter;

receiving, by the initiator end apparatus from the first user, a setting on the interaction parameter on the second interface, wherein the setting comprises an editing operation or a selection operation; and sending, by the initiator end apparatus and in response to receiving an operation on the first button, an interaction message to a receiver end apparatus based on the setting on the interaction parameter, wherein the interaction message comprises the interaction parameter.

2. The method of claim 1, further comprising storing, by the initiator end apparatus, the static resource set.

3. The method of claim 1, further comprising:

obtaining, by the receiver end apparatus, the static resource set from the third device based on the interaction message; and displaying, by the receiver end apparatus, a fourth interface based on a second static resource in the static resource set and the interaction parameter, wherein the fourth interface comprises information corresponding to the interaction parameter.

4. The method of claim 3, wherein the interaction message further comprises an identifier of the static resource set, wherein obtaining the static resource set from the third device is based on the identifier, and wherein the static resource set includes one or more static resources indicating one or more interaction service processes.

5. The method of claim 3, further comprising:

receiving, by the receiver end apparatus from a second user, a second setting on a feedback parameter on the fourth interface;

displaying, by the receiver end apparatus, a fifth interface based on the second setting, wherein the fifth interface comprises a second button for confirming the second setting on the feedback parameter;

sending, by the receiver end apparatus, a feedback message to the initiator end apparatus in response to receiving a first operation performed on the second button, wherein the feedback message comprises the feedback parameter; and displaying, by the initiator end apparatus, a sixth interface based on the feedback message.

6. The method of claim 5, wherein the fourth interface comprises at least one of one or more second edit boxes or one or more second options, and wherein receiving the second setting on the feedback parameter on the fourth interface comprises receiving, by the receiver end apparatus from the second user, at least one of one or more editing operations of the second user on the one or more second edit boxes on the fourth interface or one or more selection operations on the one or more second options on the fourth interface.

7. The method of claim 1, wherein displaying the second interface comprises:

parsing, by the initiator end apparatus, the first static resource corresponding to the first tool to obtain the first interaction service process indicated by the first static resource; and running, by the initiator end apparatus, the first tool based on the first interaction service process indicated by the first static resource to display the second interface.

8. The method of claim 1, wherein receiving the setting on the interaction parameter on the second interface comprises receiving, by the initiator end apparatus from the first user, at least one of one or more editing operations on the one or more first edit boxes on the second interface or one or more selection operations on the one or more first options on the second interface.

9. The method of claim 1, wherein the first static resource is a predefined invoked static resource in the static resource set.

10. The method of claim 1, wherein sending the interaction message to the receiver end apparatus comprises sending, by the initiator end apparatus using a fourth device, the interaction message to the receiver end apparatus based on the setting on the interaction parameter on the second interface, and wherein the fourth device is for managing a live streaming service.

11. The method of claim 1, wherein the editing operation comprises at least one of editing: a question, a bullet comment, a comment, a message, a shopping link, or a download link.

12. The method of claim 1, wherein the selection operation comprises at least one of selecting: an emoji option, a card option, an animation option, a gift option, or an action option.

13. A method for data interaction during live streaming, comprising:

displaying, by an initiator end apparatus of a first user, a second interface based on a first static resource that is in a static resource set and that corresponds to a first tool in response to receiving a selection operation of the first user on the first tool on a first interface, wherein the first interface is a live streaming interface including options of one or more tools, wherein the second interface is for setting, by the first user, an interaction parameter within the first tool, wherein the static resource set is customized according to an interaction requirement, and wherein the first static resource indicates a first interaction service process;

receiving, by the initiator end apparatus from the first user, a setting on the interaction parameter on the second interface, wherein the interaction parameter represents at least one of information edited by the first user or an option selected by the first user;

sending, by the initiator end apparatus, an interaction message to a receiver end apparatus of a second user during the live streaming based on the setting on the interaction parameter, wherein the interaction message comprises the interaction parameter;

receiving, by the initiator end apparatus in response to the interaction message, a feedback message from the receiver end apparatus, wherein the feedback message comprises a feedback parameter set by the second user at the receiver end apparatus in response to the interaction parameter; and displaying, by the initiator end apparatus, a sixth interface based on the feedback message.

14. The method of claim 13, wherein sending, by the initiator end apparatus, the interaction message to the receiver end apparatus based on the setting on the interaction parameter comprises:

displaying, by the initiator end apparatus, a third interface based on the setting, wherein the third interface comprises a first button for confirming the setting on the interaction parameter; and sending, by the initiator end apparatus, the interaction message to the receiver end apparatus in response to receiving an operation on the first button.

15. The method of claim 13, further comprising obtaining, by the initiator end apparatus, the static resource set from a third device that manages an interaction service, wherein the static resource set is customized according to the interaction requirement.

16. The method of claim 13, wherein displaying, by the initiator end apparatus, the second interface based on the first static resource that is in the static resource set and that corresponds to the first tool comprises:

parsing, by the initiator end apparatus, the first static resource corresponding to the first tool to obtain the first interaction service process indicated by the first static resource; and running, by the initiator end apparatus, the first tool based on the first interaction service process indicated by the first static resource to display the second interface.

17. The method of claim 13, wherein the second interface comprises at least one of one or more first edit boxes or one or more first options, and wherein receiving, by the initiator end apparatus, the setting on the interaction parameter on the second interface further comprises receiving, by the initiator end apparatus, at least one of an editing operation of the first user on the one or more first edit boxes on the second interface or at least one selection operation on the one or more first options on the second interface.

18. A method for data interaction during live streaming, comprising:

receiving, by a receiver end apparatus of a second user, an interaction message from an initiator end apparatus of a first user during a live streaming interaction between the initiator end apparatus and the receiver end apparatus, wherein the interaction message comprises an interaction parameter representing at least one of information edited by the first user or an option selected by the first user on a second interface of the initiator end apparatus;

obtaining, by the receiver end apparatus, a static resource set based on the interaction message from a third device that manages an interaction service, wherein the static resource set is customized according to an interaction requirement, and wherein the static resource set indicates one or more interaction service processes; and displaying, by the receiver end apparatus, a fourth interface based on a second static resource in the static resource set and based on the interaction parameter, wherein the fourth interface comprises information corresponding to the interaction parameter and one or more edit boxes or one or more options used by the second user to set a feedback parameter for sending a feedback message to the initiator end apparatus.

19. A system for data interaction during live streaming, comprising:

an initiator end apparatus of a first user configured to:

obtain a static resource set from a third device that manages an interaction service, wherein the static resource set is customized according to an interaction requirement;

display a first interface comprising options of one or more tools during a live streaming session;

display a second interface based on a first static resource that is in the static resource set and that corresponds to a first tool in response to receiving a selection operation of a first user on the first tool on the first interface, wherein the second interface is for setting, by the first user, an interaction parameter within the first tool, wherein the interaction parameter represents at least one of information edited by the first user or an option selected by the first user, wherein the first static resource indicates a first interaction service process, and wherein the second interface comprises one or more first edit boxes or one or more first options;

display a third interface based on the setting on the interaction parameter on the second interface, wherein the third interface comprises a first button that is to confirm the setting on the interaction parameter;

receive a setting on the interaction parameter on the second interface, wherein the setting comprises an editing operation or a selection operation; and send, in response to receiving an operation on the first button, an interaction message to a receiver end apparatus based on the setting on the interaction parameter, wherein the interaction message comprises the interaction parameter and an identifier of the static resource set; and the receiver end apparatus of a second user, wherein the receiver end apparatus is configured to:

receive the interaction message from the initiator end apparatus;

obtain the static resource set based on the interaction message from the third device based on the identifier; and display a fourth interface based on a second static resource in the static resource set and based on the interaction parameter, wherein the fourth interface comprises information corresponding to the interaction parameter and one or more second edit boxes or one or more second options used by the second user to set a feedback parameter for sending a feedback message to the initiator end apparatus.

20. The system of claim 19, wherein the system further comprises the third device configured to manage the interaction service, wherein the initiator end apparatus is further configured to obtain the static resource set from the third device, and wherein the receiver end apparatus is further configured to obtain the static resource set from the third device.

* * * * *